(12) United States Patent
Ito et al.

(10) Patent No.: US 7,748,684 B2
(45) Date of Patent: Jul. 6, 2010

(54) FLOW CONTROL VALVE

(75) Inventors: Akihiro Ito, Kasugai (JP); Naotsugu Seko, Nagoya (JP); Yoshihiro Matsuoka, Komaki (JP); Manami Niwa, Kasugai (JP)

(73) Assignee: CKD Corporation, Aichi (JP)

( * ) Notice: Subject to any disclaimer, the term of this patent is extended or adjusted under 35 U.S.C. 154(b) by 441 days.

(21) Appl. No.: 11/921,510

(22) PCT Filed: Jun. 20, 2006

(86) PCT No.: PCT/JP2006/312338

§ 371 (c)(1),
(2), (4) Date: Dec. 4, 2007

(87) PCT Pub. No.: WO2006/137404

PCT Pub. Date: Dec. 28, 2006

(65) Prior Publication Data

US 2009/0045366 A1  Feb. 19, 2009

(30) Foreign Application Priority Data

Jun. 24, 2005 (JP) .............................. 2005-185280

(51) Int. Cl.
*F16K 31/02* (2006.01)
(52) U.S. Cl. .................. 251/129.15; 335/296
(58) Field of Classification Search ............ 251/129.15, 251/129.16; 335/296, 297
See application file for complete search history.

(56) References Cited

U.S. PATENT DOCUMENTS

| 4,341,241 A | * | 7/1982 | Baker .......................... 137/554 |
| 4,681,142 A | | 7/1987 | Woeller et al. |
| 5,232,196 A | * | 8/1993 | Hutchings et al. ....... 251/129.08 |
| 5,544,857 A | * | 8/1996 | Torrence ................. 251/129.15 |
| 6,225,886 B1 | * | 5/2001 | Kleinert et al. .............. 335/257 |
| 7,401,762 B2 | * | 7/2008 | Ohmori et al. .............. 251/282 |
| 7,661,652 B2 | * | 2/2010 | Acar et al. ............. 251/129.15 |
| 2004/0244837 A1 | | 12/2004 | Nawata et al. |
| 2006/0081801 A1 | | 4/2006 | Takahashi et al. |

FOREIGN PATENT DOCUMENTS

| JP | U 54-117931 | 2/1979 |
| JP | U 57-65273 | 10/1982 |
| JP | U 58-69174 | 5/1983 |

(Continued)

*Primary Examiner*—John K Fristoe, Jr.
(74) *Attorney, Agent, or Firm*—Oliff & Berridge, PLC

(57) ABSTRACT

The invention has been made to provide a flow control valve capable of preventing adhesion between a fixed core and a movable core and increasing an attractive force, so that flow control can be performed with high accuracy. In a flow control valve 10, a first fixed core 23a is fixed in an upper part of a coil bobbin 21, a second fixed core 23b is fixed in a lower part of the coil bobbin 21, and the movable core 24 is formed at its lower end with a flange 24a having a diameter larger than an inner diameter of the coil bobbin 21. The movable core 24 is placed inside a cylindrical part 28a of the flared pipe 28 so that a distance D1 between the first fixed core 23a and the movable core 24 is larger than a distance D2 between the flange 24a and a disc part 28b of the flared pipe 28.

19 Claims, 23 Drawing Sheets

FOREIGN PATENT DOCUMENTS

| | | |
|---|---|---|
| JP | U 59-7974 | 1/1984 |
| JP | U 63-180782 | 11/1988 |
| JP | U 03-32267 | 3/1991 |
| JP | A 07-019363 | 1/1995 |
| JP | A 07-036547 | 2/1995 |
| JP | A 09-317927 | 12/1997 |
| JP | A 2000-146003 | 5/2000 |
| JP | A 2003-194607 | 7/2003 |
| JP | A 2004-286112 | 10/2004 |
| JP | A 2005-037409 | 2/2005 |
| JP | A 2005-061589 | 3/2005 |
| WO | WO 03/034169 A1 | 4/2003 |
| WO | WO2005/050075 A1 | 6/2005 |

* cited by examiner

CONTROL SIGNAL INPUT

CONTROL SIGNAL INPUT

FLOW CONTROL VALVE

TECHNICAL FIELD

The present invention relates to a flow control valve for controlling a flow rate and more particularly to a flow control valve capable of performing proportional control of a flow rate.

BACKGROUND ART

Heretofore, electromagnetic valves have been widely used for controlling a flow rate. Such electromagnetic valve is arranged so that the stroke of a valve element is controlled by balance between an attractive force of a fixed core and a restoring force of a spring. One of those flow control valves is shown in FIG. 27 for example (Patent Document 1).

This flow control valve 210 has a body 232 formed with an inlet passage 234 and outlet passage 235, and a valve chamber 233 which provides communication between the inlet passage 234 and the outlet passage 235. Further, in the valve chamber 233, a valve seat 236 is formed at the end of the outlet passage 235.

Above the body 232, a coil 222 is provided to excite a fixed core 223. The fixed core 223 is placed in an upper part of the coil 222 and a movable core 224 is slidably fitted in the coil 222. An end of the movable core 224 is provided with a valve element 231 and attached with a spring 225. This spring 225 urges the movable core 224 downward.

When the fluid flowing in the flow control valve 210 through the inlet passage 234 is allowed to flow from the inlet passage 234 to the outlet passage 235, the coil 222 is energized to excite the fixed core 223. The excited fixed core 223 attracts the movable core 224 to move against the urging force of the spring 225, thereby separating the valve element 231 from the valve seat 236. This allows the control fluid flowing in the inlet passage 234 to flow out from the outlet passage 235 via the valve chamber 233.

When a current to be applied to the coil 222 is changed at that time, the attractive force of the fixed core 223 will changes. This results in a change in stroke length of the movable core 224, thereby changing a distance between the valve seat 236 and the valve element 231. In this way, the valve opening can be adjusted to control a flow rate of the fluid allowed to flow out from the outlet passage 235.

However, in the aforementioned flow control valve 210, a linear stroke range of the movable core 224 (a proportional range between the voltage applied to the coil and the stroke length of the movable core) is small. The valve is therefore unsuitable for accurate flow control.

To increase the linear stroke range (the proportional range) of the movable core, therefore, a configuration that the fixed core and the movable core are designed to have tapered facing portions as shown in FIG. 28 has been practically used (Patent Document 2).

[Patent Document 1] JP63-180782 (1988)U
[Patent Document 2] JP7-19363 (1995)A

DISCLOSURE OF INVENTION

Problems to be Solved by the Invention

In the conventional flow control valves, however, there is a problem that the movable core is apt to adhere or attach to the fixed core during full opening of the valve. When the movable core adheres to the fixed core during full valve opening, the movable core could not be separated from the fixed core until the current flowing through the coil becomes a predetermined value to control the valve opening from full open to full close. When the movable core is separated from the fixed core as soon as the current flowing through the coil becomes the predetermined value, the movable core is likely to move at one stroke to a predetermined stroke position. In other words, the proportional control could not be performed until the current flowing through the coil becomes the predetermined value. The proportional characteristics would be extremely deteriorated, which makes it hard to execute accurate flow control (see a broken line in FIG. 3).

There is also another problem that the tapered facing portions of the fixed core and the movable core cause a decrease in attractive force of the fixed core needed for a valve opening operation with respect to the movable core (see an alternate long and short dash line in FIG. 2). If the attractive force of the fixed core to the movable core is small, the urging force of the spring to the movable core has to be lowered, otherwise the movable core could not be attracted. When the attractive force of the fixed core to the movable core is small, therefore, the urging force of the spring to the movable core is inevitably small, leading to lower sealing strength during a valve closed condition, which affects the flow control.

To increase the attractive force, a current to be applied to the coil may be increased. However, this increase in the current to be applied to the coil will also cause the coil to generate a large amount of heat. Such heating problem may be solved if the volume of the coil is increased, but another problem with an increase in size of the coil occurs.

The present invention has been made to solve the above problems and has an object to provide a flow control valve capable of performing accurate flow control by preventing a fixed core and a movable core from adhering to each other and also by increasing an attractive force.

Means for Solving the Problems

To achieve the above purpose, the present invention provides a flow control valve comprising: a valve body provided with an inlet passage, an outlet passage, a valve chamber which provides communication between the inlet passage and the outlet passage, and a valve seat formed in a communication area between the valve chamber and the outlet passage; a coil including wire wound on a hollow coil bobbin; a first fixed core fixed in an upper part of the coil bobbin; a second fixed core fixed in a lower part of the coil bobbin; a nonmagnetic flared pipe including a cylindrical part fixed to the first fixed core and a disc part formed around the periphery of a lower end of the cylindrical part, part of the disc part being held between the second fixed core and the valve body; a movable core placed slidably in the cylindrical part of the flared pipe and provided at its lower end with a valve element; and a spring that always urges the movable core in a direction to move away from the first fixed core to bring the valve element into contact with the valve seat; the movable core being formed at its lower end with a flange part having a diameter larger than an inner diameter of the coil bobbin, the flange being placed in the valve chamber, and a distance between the first fixed core and the movable core is set to be larger than a distance between the flange and the disc part of the flared pipe while the valve element is in the valve seat.

In the above flow control valve, during a normal condition (non-energization of the coil), the movable core is urged in a direction to separate from the first fixed core by the spring, and therefore the valve element is held in contact with the valve seat, in a valve closed state. Upon energization of the coil, the movable core is attracted by the first fixed core and the second fixed core, moving the valve element away from the valve seat, into a valve open state. At that time, when the current to be applied to the coil is changed, the attractive forces of the first and second fixed cores change, thereby changing a sliding amount of the movable core. Thus, the distance (valve opening) between the valve seat and the valve element can be changed. This makes it possible to control a flow rate of fluid allowed to flow out from the outlet passage.

In the flow control valve of the present invention, the movable core is formed at its lower end with the flange having a larger diameter than an inner diameter of the coil bobbin, the flange being placed in the valve chamber. The distance between the first fixed core and the movable core in a state where the valve element is in contact with the valve seat is larger than the distance between the flange and the disc part of the flared pipe. During valve fully opening, the movable core comes into contact with the disc part of the flared pipe before the movable core comes into contact with the first fixed core. Accordingly, the movable core does not adhere to the first fixed core. Since the disc part of the nonmagnetic flared pipe is interposed between the second fixed core and the movable core, the second fixed core and the movable core are unlikely to adhere to each other. In the flow control valve of the invention, as above, the fixed core does not adhere to the fixed core, so that the proportional characteristics will not be deteriorated. Consequently, accurate flow control can be performed.

In the flow control valve of the invention, furthermore, the flange is formed at the lower end of the movable core. Accordingly, in the gap between the second fixed core and the movable core, a large area through which magnetic flux passes can be provided. When the same current as before is applied to the coil, the magnetic characteristics can be enhanced, thus increasing the attractive force.

In the flow control valve according to the invention, preferably, the movable core and the fixed core are formed with tapered facing portions.

Such configuration makes it possible to increase a linear stroke range (a proportional range) of the movable core. The flow control valve of the invention can therefore produce the attractive force larger than that of the conventional product with the movable core and the fixed core having the tapered facing portions. Thus, flow control can be executed with more accuracy.

Preferably, the flow control valve according to the invention further comprises an adjustment mechanism for adjusting an urging force of the spring with respect to the movable core.

This configuration allows adjustment of a set load of the spring in a valve assembling operation, so that the set load can be made uniform from spring to spring. Consequently, the controllability of the flow control valve can be enhanced, thereby achieving more accurate flow control.

Preferably, the flow control valve according to the invention further comprising a resin member interposed between the flared pipe and the movable core.

Further, the resin member may be formed of fluorinated resin or the like. It is to be noted that the resin may be selected from for example fluorinated ethylene propylene, polyamide, or polypropylene.

Such resin member reduces sliding resistance of the movable core, allowing smooth movement of the movable core. The proportional characteristics of the flow control valve can therefore be enhanced to stably and accurately perform flow control.

Preferably, the length of the resin member is set to be half or more of the length of a portion of the movable core slidable in the flared pipe. The portion of the movable core which slides in the flared pipe corresponds to a portion of the movable core excepting the flange.

The reason is in that, when the length of the resin member is shortened to half the length of the part of the movable core slidable in the flared pipe, the portion uncovered with the resin member is increased, causing the movable core to move slightly inclining. When the movable core move slightly inclining, the movable core will not move smoothly, deteriorating the controllability of the flow control valve (see FIG. 21).

Preferably, the length of the resin member is set to be ¾ or more of the length of the portion of the movable core which can slide in the flared pipe. Setting the length of the resin member to be ¾ or more of the length of the portion of the movable core slidable in the flared pipe allows smooth movement of the movable core. Thus, hysteresis of the flow control valve can be reduced and the response and controllability can also be enhanced (see FIGS. 21 and 22).

Here, it is preferable that the resin member is placed in such a manner as to be in contact with the periphery of an end of the movable core closer to the first fixed core while the valve element is in a full open state.

In the case where the resin member is attached to the movable core, one end of the resin member has to be aligned with an end of the periphery of the movable core closer to the first fixed core. In the case where the resin member is attached to the inside of the flared pipe, one end of the resin member has to be positioned nearer to a first fixed core side than the end of the periphery of the movable core closer to the first fixed core in full valve opening.

This arrangement of the resin member can prevent the movable core from moving slightly inclining in the case where the resin member having the same length is used, thereby allowing smoother movement of the movable core (see FIG. 23). As a result, the controllability of the flow control valve can be further enhanced and more stable and accurate flow control can be performed.

To solve the above problems, a flow control of the present invention is characterized by comprising: the flow control valve according to any one of claims 1 to 7; a flow sensor for measuring a flow rate; and control means for controlling an opening degree of the flow control valve based on output of the flow sensor so that a measurement value obtained by the flow sensor becomes a target value.

In this flow controller, the control means is arranged to control the opening of the flow control valve based on outputs of a flow sensor so that a measured value obtained by the flow sensor becomes a target value, thereby controlling a flow rate. In this flow controller, the flow control is performed by any one of the aforementioned flow control valves, so that more high accurate flow control can be realized.

In the flow controller according to the invention, preferably, the flow sensor includes: a sensor passage across which a hot wire is laid to measure the flow rate; a bypass passage with respect to the sensor passage; and a laminated body composed of laminated thin plates each having an opening to internally divide a fluid into the sensor passage and the bypass passage.

In the flow sensor built in the flow controller, accordingly, the fluid is divided into the sensor passage and the bypass passage by the laminated body. By detecting a change in resistance of a hot wire laid across the sensor passage, which is caused by the fluid flowing in the sensor passage, i.e., by utilizing the measurement principle, the flow rate of the fluid flowing in the sensor passage and hence the flow rate of the fluid flowing inside the flow sensor body can be measured. By use of a mesh or the like as the thin plate constituting the laminated body, the laminated body can have a rectifying mechanism. It is therefore possible to rectify the flow of the measured fluid which flows in the sensor passage, thus stabilizing measurement output.

In the flow controller of the invention, the flow control is performed by any one of the aforementioned flow control valves by measuring the flow rate with the above flow sensor. Accordingly, the flow control can be executed with very high accuracy.

Here, it is preferable that the control means is arranged to control the opening degree of the flow control valve by PWM control.

In the PWM control, ON and OFF are continuously repeated. For the constant valve opening, the movable core can be slightly vibrated. Thus, the movable core can be held in a dynamic friction state, so that the movable core is excellent in followability to slight variations in stroke length. This can result in a reduction in hysteresis of the flow control valve.

Further, the carrier frequency in the PWM control may be set to be more than 200 Hz. This is because when the carrier frequency is set to be less than 200 Hz, the controllability and the response of the flow control valve is deteriorated (see FIGS. 25 and 26). The upper limit of the carrier frequency varies according to the performance of the control means and therefore may be set according to the performance of the control means.

More preferably, the carrier frequency in the PWM control is set in a range of 500 to 1000 Hz. The carrier frequency set in this range makes it possible to enhance the response and prevent overshoot, thereby providing very stable controllability to the flow control valve (see FIG. 26).

ADVANTAGES OF THE INVENTION

According to the flow control valve of the invention, the fixed core and the movable core are prevented from adhering to each other and the attractive force is increased, so that the flow control can be performed with more accuracy. According to the flow controller of the invention, using the flow control valve of the invention, can perform the flow control with high accuracy.

EXPLANATION OF REFERENCE CODES

Figure 1:
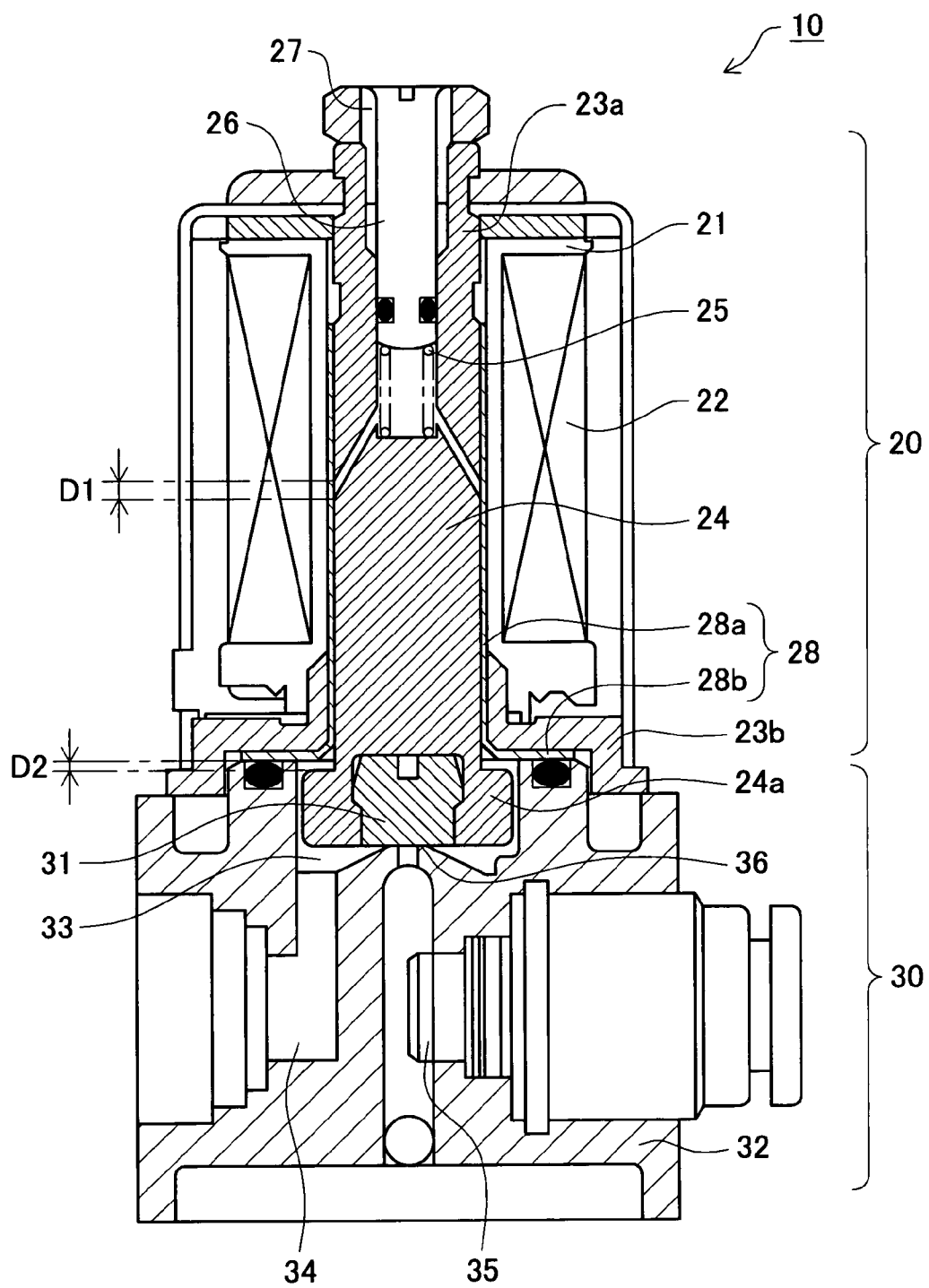
FIG. 1 is a sectional view showing a schematic configuration of a flow control valve of a preferred embodiment.

10, 10a Flow control valve
21 Coil bobbin
22 Coil
23a First fixed core
23b Second fixed core
24 Movable core
24a Flange
25 Spring
27 Adjustment screw
28 Flared pipe
28a Cylindrical part
28b Disc part
29 Resin tube
31 Valve element
32 Valve body
33 Valve chamber
34 Inlet passage
35 Outlet passage
36 Valve seat
100, 100a Flow controller

BEST MODE FOR CARRYING OUT THE INVENTION

A detailed description of a preferred embodiment of a flow control valve embodying the present invention will now be given referring to the accompanying drawings. A schematic configuration of the flow control valve of the present embodiment is first shown in FIG. 1. FIG. 1 is a sectional view showing the schematic configuration of the flow control valve.

This flow control valve 10 mainly includes a drive section 20 and a valve section 30 as shown in FIG. 1. In the drive section 20, a conductive wire is wound around a cylindrical coil bobbin 21 to form a coil 22. A first fixed core 23a of a hollow shape is inserted in an upper open end of the coil bobbin 21. A movable core 24 is fitted in a lower open end of the coil bobbin 21 and located under the first fixed core 23a. A second fixed core 23b is placed under a lower part of the coil bobbin 21. The first fixed core 23a and the movable core 24 are formed with tapered (upward protruding) portions facing each other. A nonmagnetic flared pipe 28 is sandwiched between the coil bobbin 21 and the movable core 24. This flared pipe 28 includes a cylindrical part 28a and a disc part 28b formed around the periphery of a lower end of the cylindrical part 28a. An upper portion of the cylindrical part 28a is welded to the first fixed core 23a and part of the disc part 28b is caught between the second fixed core 23b and the valve body 32.

In the first fixed core 23a, a spring 25 and a spring retainer 26 are placed to always urge the movable core 24 downward in the figure. An adjustment screw 27 is engaged in the top of the spring retainer 26. Operation of the adjustment screw 27 allows adjustment of the position of the spring retainer 26 to control the urging force of the spring 25 to the movable core 24. Accordingly, the set load of the spring 25 can be made uniform during a valve assembling work.

The movable core 24 is formed at its lower end with a flange 24a having a larger diameter than an inner diameter of the coil bobbin 21. This can provide a large area allowing magnetic flux to pass through in a gap between the second fixed core 23b and the movable core 24. This makes it possible to prevent a decrease in attractive force of the fixed cores 23a and 23b against the movable core 24 even though the facing portions of the first fixed core 23a and the movable core 24 are formed to be tapered.

On the other hand, the valve section 30 includes a valve element 31 embedded in the flange 24a of the movable core 24 and a valve body 32. The valve body 32 is formed with a valve chamber 33 in which the flange 24a with the valve element 31 is placed. The valve body 32 is formed with an inlet passage 34 and an outlet passage 35 which are communicated to each other through the valve chamber 33. A valve seat 36 is formed in a communication area between the valve chamber 33 and the outlet passage 35.

Here, the movable core 24 is disposed in such a way that a distance D1 between the first fixed core 23a and the movable core 24 is larger than a distance D2 between the flange 24a and the disc part 28b of the flared pipe 28 while the valve element 31 is in contact with the valve seat 36. Accordingly, the movable core 24 is prevented from coming into close contact with the first fixed core 23a during full valve opening because the upper surface of the flange 24a of the movable core 24 comes into contact with the disc part 28b of the flared pipe 28 before the movable core 24 contacts with the first fixed core 23a. Further, the upper surface of the flange 24a contacts with the disc part 28b of the flared pipe 28 and hence the movable core 24 does not come into contact with the second fixed core 23b.

In the aforementioned flow control valve 10, the movable core 24 is urged downward by the spring 25 during a normal condition (non-energization of the coil 22). The valve element 31 located at the lower end of the movable core 24 is therefore held in contact with the valve seat 36. This interrupts communication between the inlet passage 34 and the outlet passage 35, establishing a valve closed condition.

When the coil 22 is energized, the fixed cores 23a and 23b attract the movable core 24 upward in the figure against the urging force of the spring 25 to hold the same there. The valve element 31 is therefore separated from the valve seat 36, thereby allowing communication between the inlet passage 34 and the outlet passage 35 to establish a valve open state. When a current to be applied to the coil 22 is changed at that time, the attractive force of the fixed cores 23a and 23b is changed. Increasing the current to be applied to the coil 22 will increase the attractive force, whereas decreasing the current to be applied to the coil 22 will decrease the attractive force. By changing the attractive force in this way, the stroke length of the movable core 24 can be changed to control the distance (namely, a valve opening degree) between the valve element 31 and the valve seat 36. Consequently, the flow rate of fluid to be discharged from the outlet passage 35 can be controlled. More specifically, the flow rate is increased when the current to be applied to the coil 22 is increased, while the flow rate is decreased when the current to be applied to the coil 22 is decreased.

Figure 2:
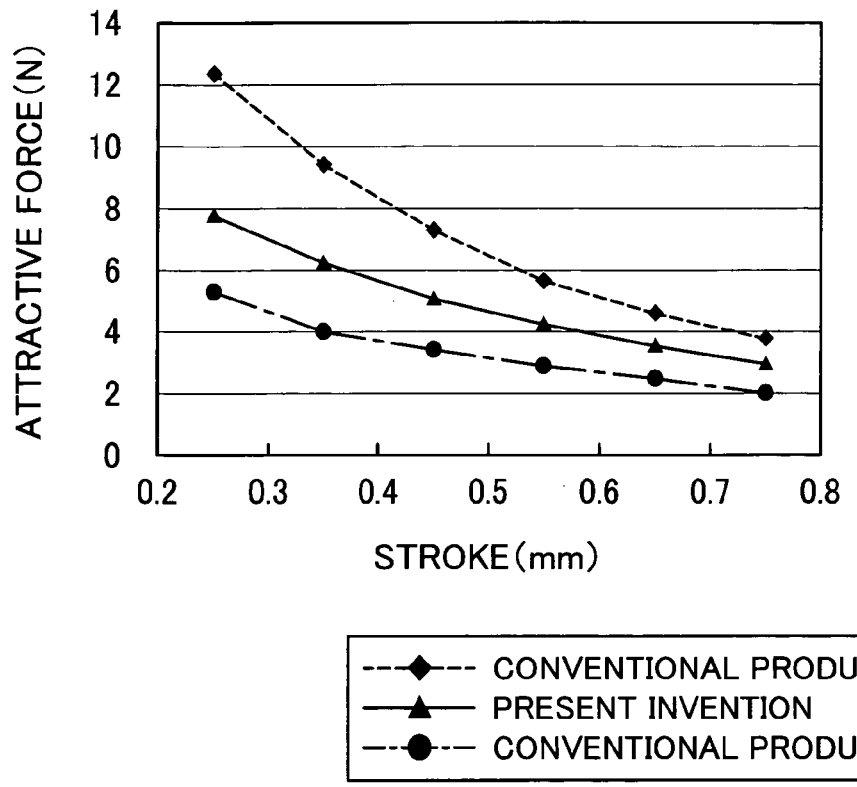
FIG. 2 is a graph showing a relationship between a current to be applied to a coil and a flow rate.
Figure 27:
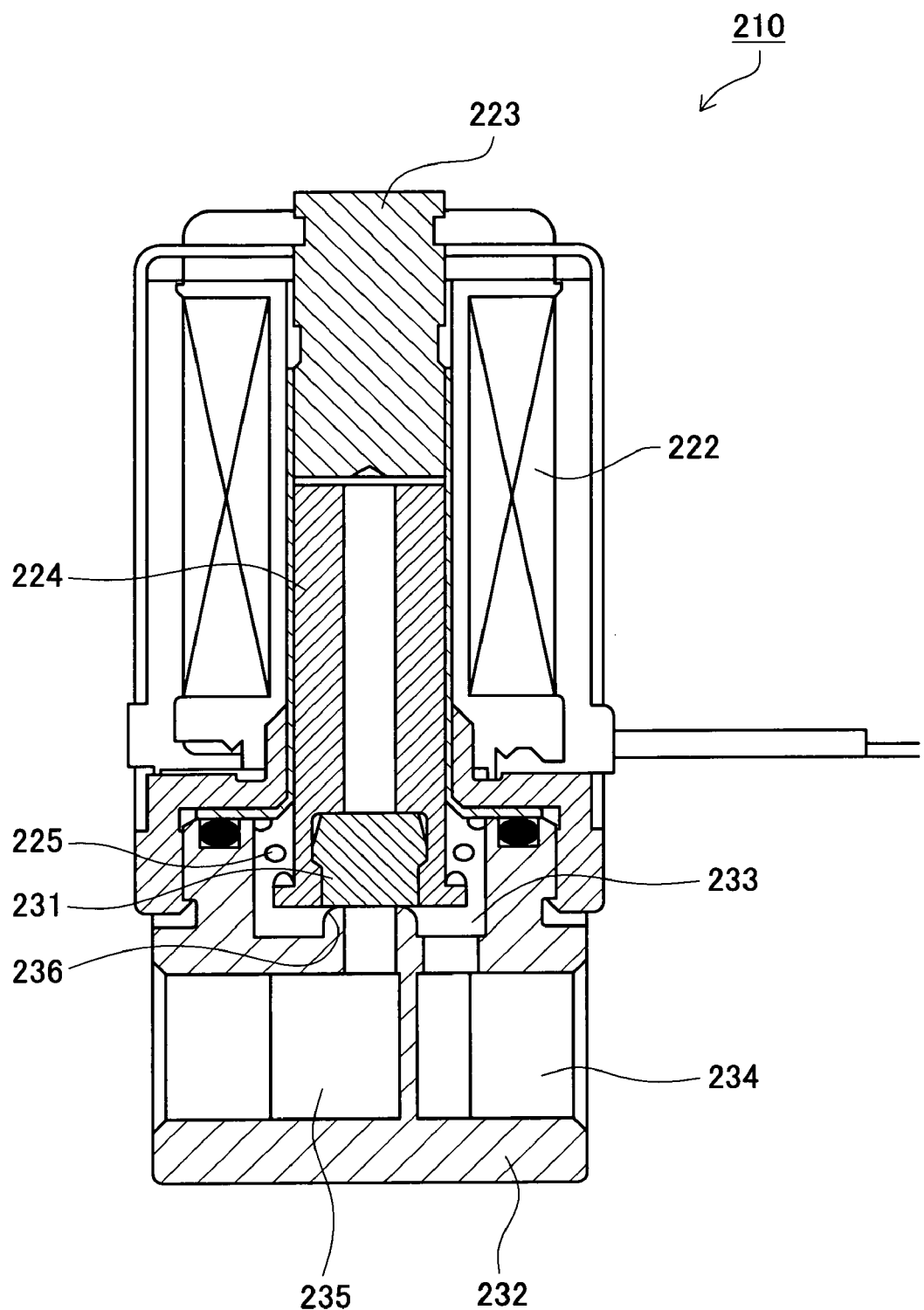
FIG. 27 is a sectional view of a flow control valve in a prior art.

The flow control valve 10 in which the facing portions of the first fixed core 23a and the movable core 24 are tapered can provide a large linear proportional range between the attractive force of the fixed cores 23a and 23b and the stroke length of the movable core 24 and good proportional characteristics as compared with a conventional product A (the facing portions of the fixed core and the movable core are not tapered: see FIG. 27) as shown in FIG. 2.

Figure 28:
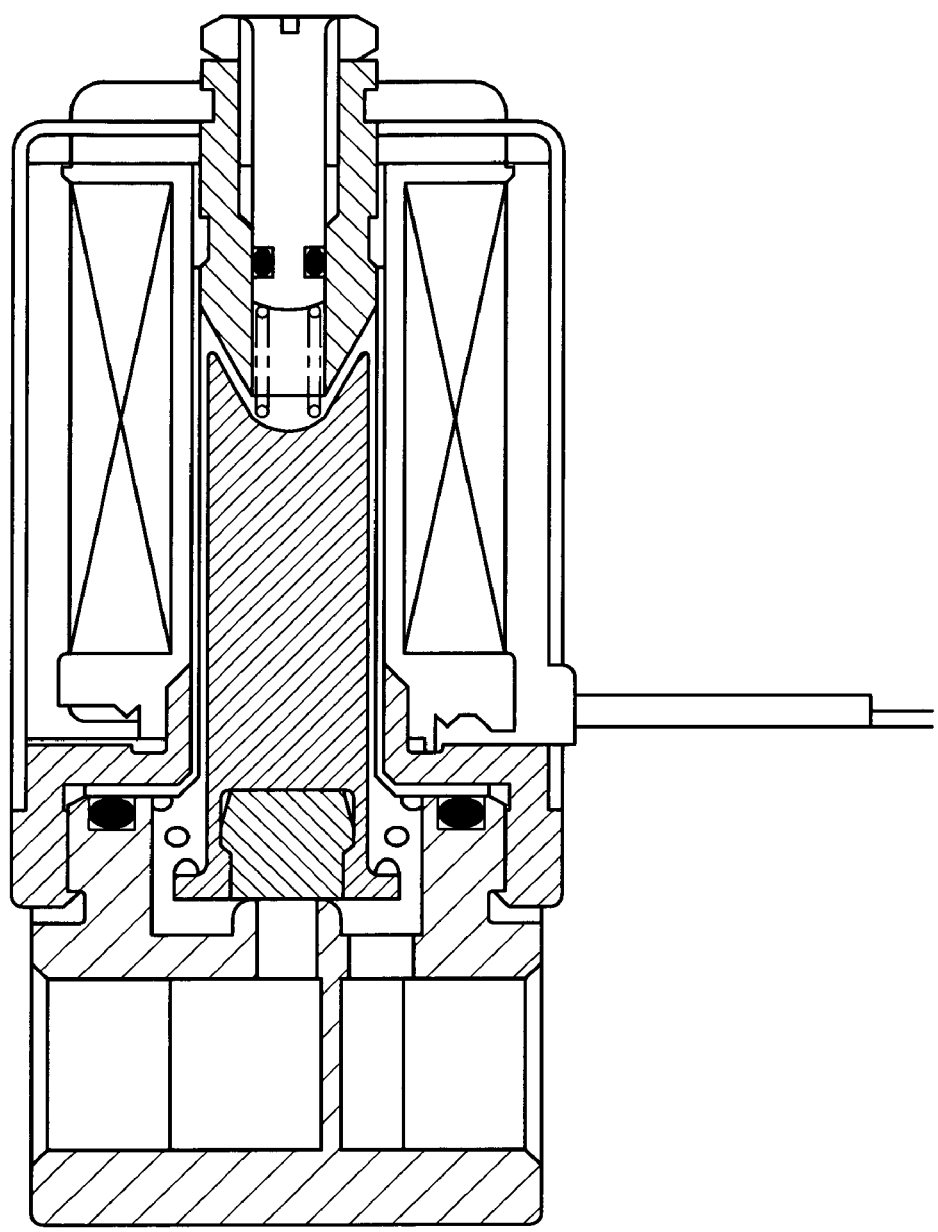
FIG. 28 is a sectional view of another flow control valve in a prior art.

In the flow control valve 10, furthermore, the movable core 24 is formed at its lower end with the flange 24a having a larger diameter than the inner diameter of the coil bobbin 21. Therefore, the attractive force of the fixed cores 23a and 23b is large and the magnetic characteristics are enhanced as compared with the conventional product B (the facing portions of the fixed core and the movable core are tapered: see FIG. 28) as shown in FIG. 2. This configuration makes it possible to prevent a decrease in attractive force of the fixed cores 23a and 23b resulting from the tapered facing portions of the first fixed core 23a and the movable core 24.

Figure 3:
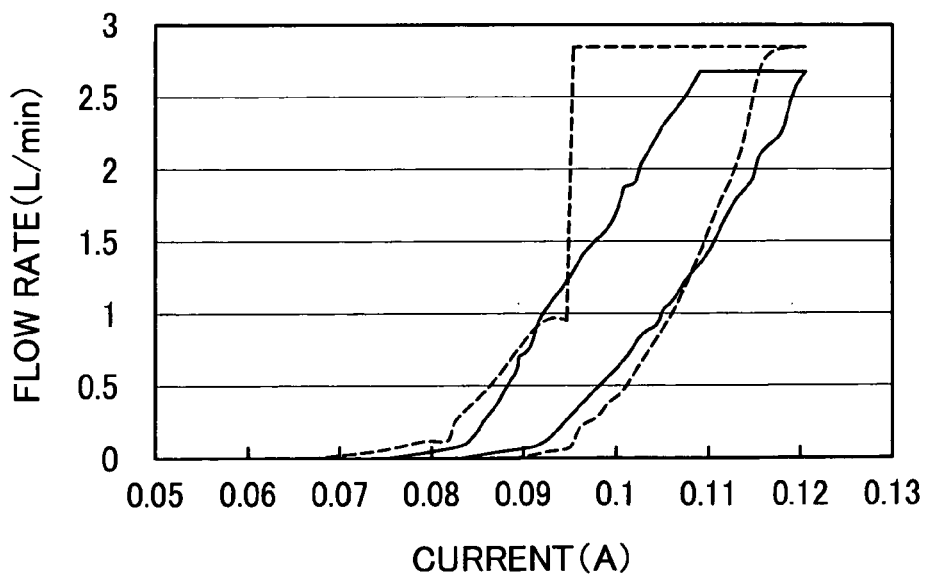
FIG. 3 is a graph showing a relationship between stroke length and an attractive force of a fixed core.

In the flow control valve 10, the movable core 24 is placed so that the distance D1 between the first fixed core 23a and the movable core 24 is larger than the distance D2 between the flange 24a and the disc part 28b of the flared pipe 28. Thus, the movable core 24 does not come into close contact with the fixed core 23a during full valve opening. As shown by a solid line in FIG. 3, for controlling the opening degree in a valve closing direction, the flow control valve 10 can avoid a situation in which the movable core 24 does not move away from the fixed core 23a until the current applied to the coil 22 becomes a predetermined value. The flow rate can be reduced in proportion to the amount of decrease of the current to be applied to the coil 22. As above, unlike the conventional products, the flow control valve 10 can prevent deterioration of proportional characteristics during the control of opening from full open to full close.

When the energization of the coil 22 is stopped, on the other hand, the movable core 24 will not be attracted by the fixed cores 23a and 23b. Then, the movable core 24 is moved downward by the urging force of the spring 25, bringing the valve element 31 into contact with the valve seat 36. This interrupts communication between the inlet passage 34 and the outlet passage 35, establishing a valve closed condition.

Figure 4:
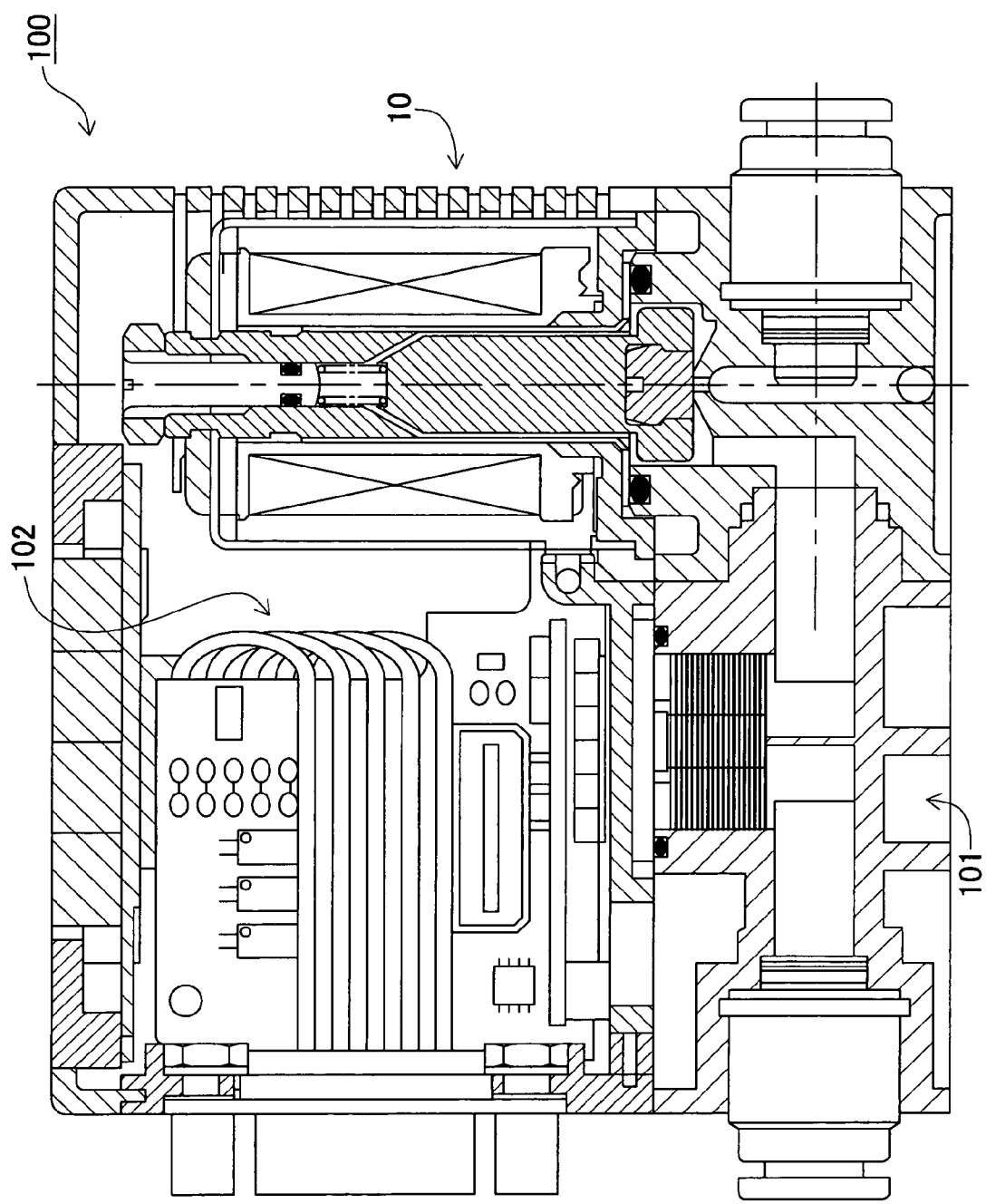
FIG. 4 is a sectional view showing a schematic configuration of a flow controller of the preferred embodiment.
Figure 5:
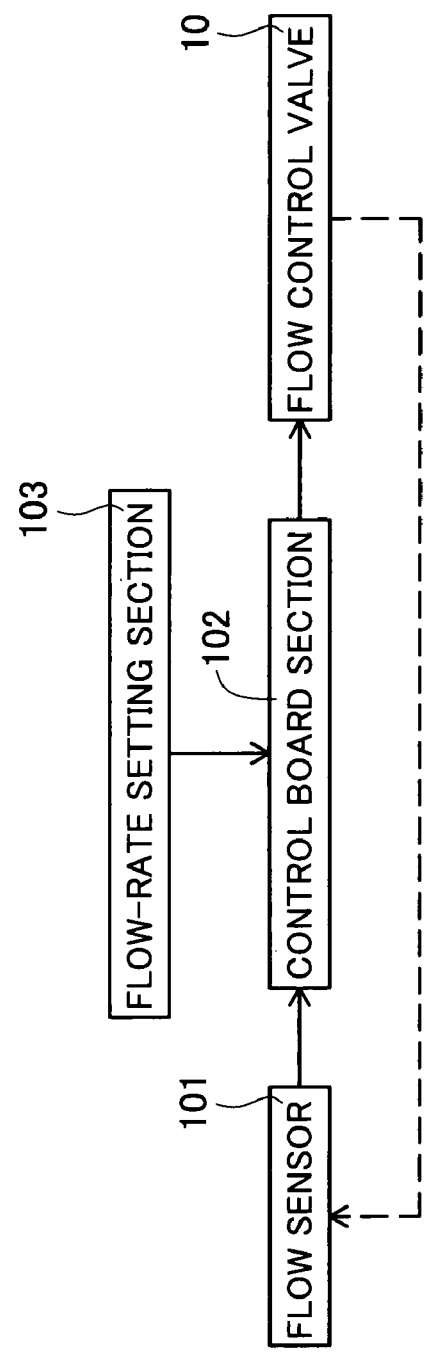
FIG. 5 is a block diagram showing a configuration of a control system of the flow controller of FIG. 4.

Next, a flow controller in which the above flow control valve 10 is built in will be described below referring to FIGS. 4 and 5. FIG. 4 is a sectional view showing a schematic configuration of the flow controller. FIG. 5 is a block diagram showing a control system of the flow controller.

This flow controller 100 includes the aforementioned flow control valve 10, a flow sensor 101, a control board section 102, and a flow-rate setting section 103. The valve opening degree of the flow control valve 10 is changed based on a detection value of the flow sensor 101 to obtain a target flow rate.

Figure 6:
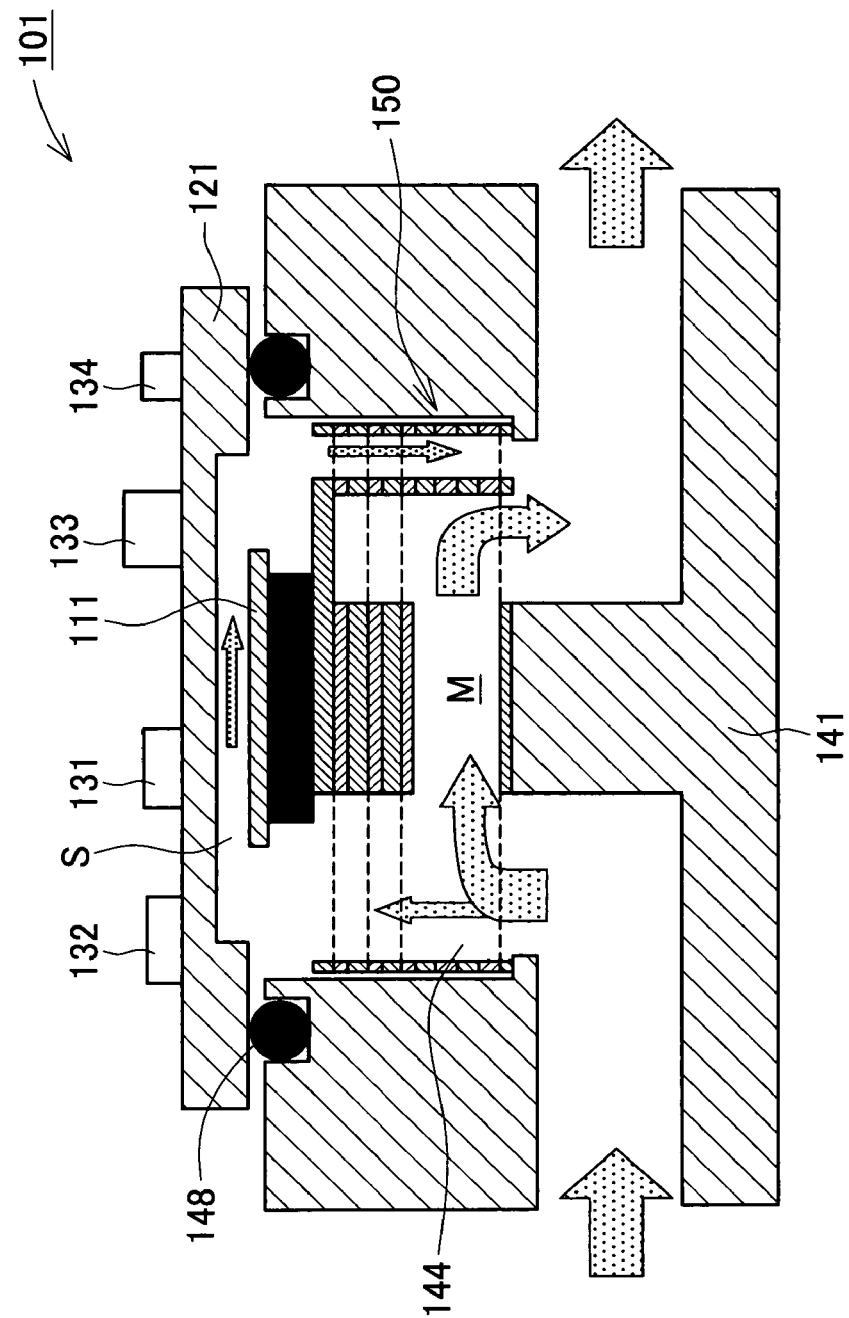
FIG. 6 is a sectional view showing a schematic configuration of a flow sensor built in the flow controller of FIG. 4.

The flow sensor 101 includes a body 141, a sensor substrate 121, and a laminated filter 150 as shown in FIG. 6. While the laminated filter 150 is placed in a passage space 144 of the body 141, the sensor substrate 121 is secured in close contact with the body 141 with screws through seal gaskets 148. Accordingly, a sensor passage S and a main passage M which serves as a bypass passage with respect to the sensor passage S are formed.

Figure 7:
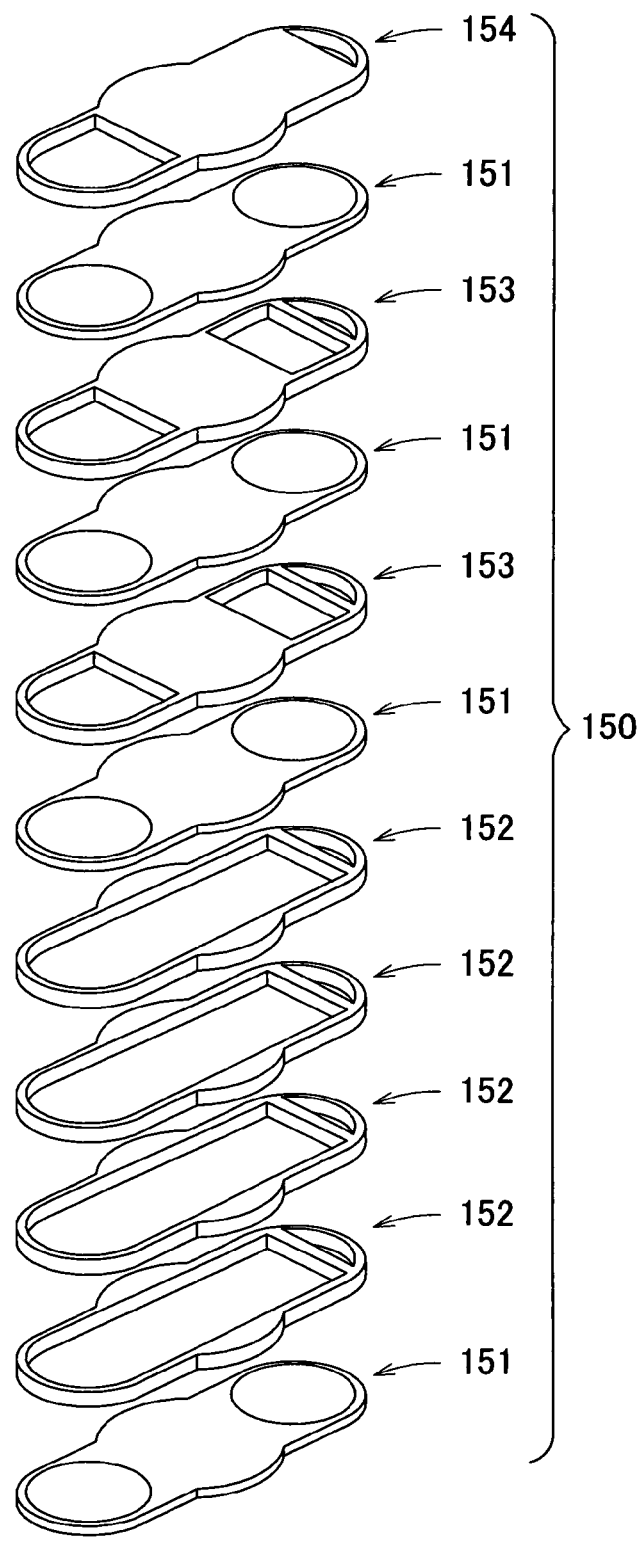
FIG. 7 is an exploded perspective view of a laminated filter provided in the flow sensor of FIG. 6.

The laminated filter 150 is constituted of eleven thin plates laminated as shown in FIG. 7. Specifically, in the order from bottom to top, a mesh plate 151, first shielding plates 152, 152, 152, and 152, a mesh plate 151, a second shielding plate 153, a mesh plate 151, a second shielding plate 153, a mesh plate 151, and a third shielding plate 154 are bonded in lamination. All of the thin plates 151 to 154 are 0.5 mm or less in thickness and processed (micromachining process) into respective shapes by etching.

In the sensor substrate 121, a measuring chip 111 including a plurality of measuring hot wires is mounted. An electric circuit comprised of electric elements 131, 132, 133, 134, and others is provided on the surface of the sensor substrate 121 opposite the chip 111. This electric circuit is connected to the control board section 102. The sensor substrate 121 and the measuring chip 111 are formed with grooves allowing mutual overlapping in a mounted state. With this configuration, when the sensor substrate 121 mounted with the measuring chip 111 is held in close contact with the body 141 through the gasket 148, in the passage space 144 of the body 141, the sensor passage S is formed between the sensor substrate 121 and the measuring chip 111 and also measuring hot wires are laid like a bridge across the sensor passage S.

In the above configured flow sensor 101, a fluid to be measured is allowed to pass through the laminated filter 150 including the mesh plates 151 and then flow in the sensor passage S. Thus, the flow of the fluid to be measured is rectified in flowing in the sensor passage S, producing stable measurement output.

When the target flow rate is to be obtained by use of the above flow controller 100, the target flow rate is first set on the flow rate setting section 103. Then, target flow rate data is input to the control board section 102. The control board section 102 also receives flow rate data detected by the flow sensor 101. The control board 102 feedback controls the valve opening degree of the flow control valve 10 so that the target flow rate data and the flow rate data become equal by comparing them. By this feedback control, the valve opening degree of the flow control valve 10 is controlled to obtain the target flow rate. Using the flow control valve 10 having excellent proportional control characteristics and the flow sensor 101 whereby stable measurement output is obtained, the flow controller 100 can execute flow control with very high accuracy.

Figure 8:
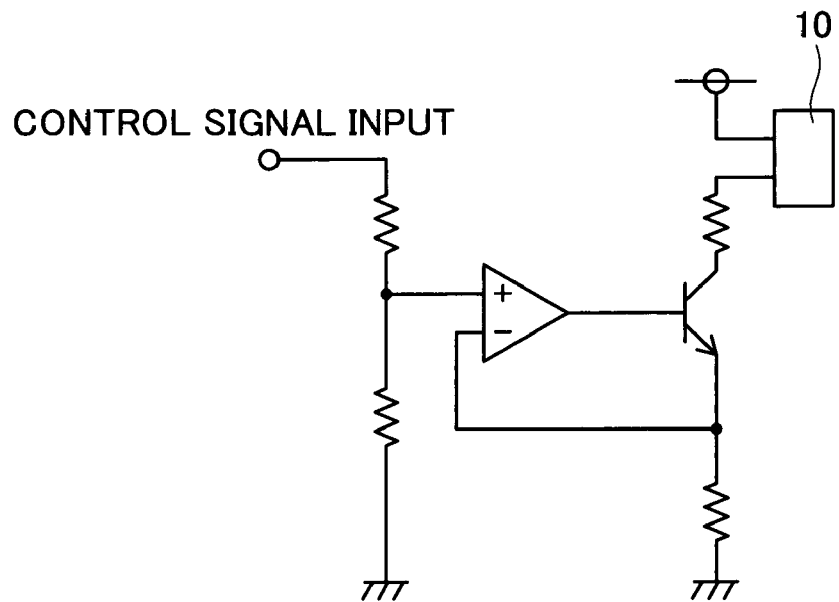
FIG. 8 is a circuit diagram of a constant current control circuit.

If the control board section 102 executes energization control with respect to the flow control valve 10 by constant current control using the constant current circuit shown in FIG. 8 as in the prior art, there is a problem that a large amount of heat is generated in a transistor, because the transistor functions as a resistor in the constant current circuit. The constant current control further has a problem that the movable core 24 is inferior in followability to slight variations in stroke length. This is because, in the constant current control, when the valve opening degree is constant, the movable core 24 is in a stop state (OFF state) and a static friction state, and will be changed to a dynamic friction state when activated. FIG. 8 is a circuit diagram of the constant current control circuit.

Figure 9:
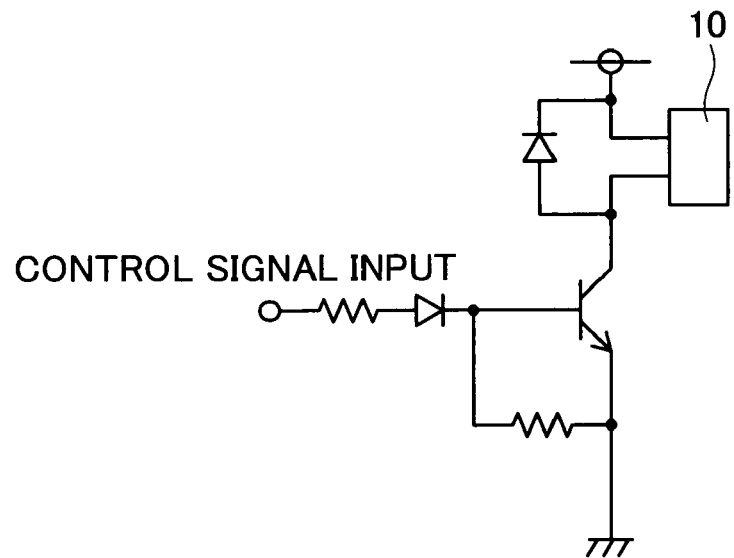
FIG. 9 is a circuit diagram of a PWM control circuit for performing energization control with respect to the flow control valve of the present embodiment.

In the present embodiment, the energization control to the flow control valve 10 is performed by the PWM control. More specifically, the opening and closing operations of the flow control valve 10 are controlled by a PWM control circuit shown in FIG. 9. That is, the valve opening degree of the flow control valve 10 is controlled by changing a duty ratio. FIG. 9 is a circuit diagram of the PWM control circuit which controls energization to the flow control valve of the present embodiment. The carrier frequency may be set in a range of 200 to 5000 Hz.

Controlling the valve opening degree of the flow control valve 10 by the PWM control as above can restrain the amount of heat generated in the transistor, because the transistor in the PWM control circuit functions as an ON/OFF switch, which generates a small amount of heat. Since the amount of heat generated in the transistor is small, a small sized transistor can be used and thus the flow controller 100 can be downsized.

The controllability of the valve opening degree of the flow control valve 10 can be stabilized by the dither effect. Since ON and OFF are normally repeated in the PWM control, the movable core 24 slightly vibrates (but appears to be at rest) when the valve opening degree is constant. The movable core 24 is always in the dynamic friction state, so that the movable core 24 is excellent in followability to slight variations in stroke length.

The aforementioned flow controller 100 can be variously used, e.g., for wire bonding, ionizer, glass floating transfer, food packaging, flow control of purge gas, flow control of argon gas for welding, and flow control in the heating power control of a burner. Use of the flow controller 100 makes it possible to solve any problems in each usage.

A conventional tension control of gold wire for wire bonding has been conducted by blowing air to the gold wire. As the size of electronic parts has been increasingly reduced recently, the gold wire for wire bonding has been thinner and thinner. Fine control of flow rate is therefore required. More specifically, it is necessary to control the flow rate with a metering valve (a needle valve) by monitoring the flow rate with the flow sensor. However, this method may cause a change in flow rate as original pressure varies and therefore the tension could not be maintained constant.

Figure 10:
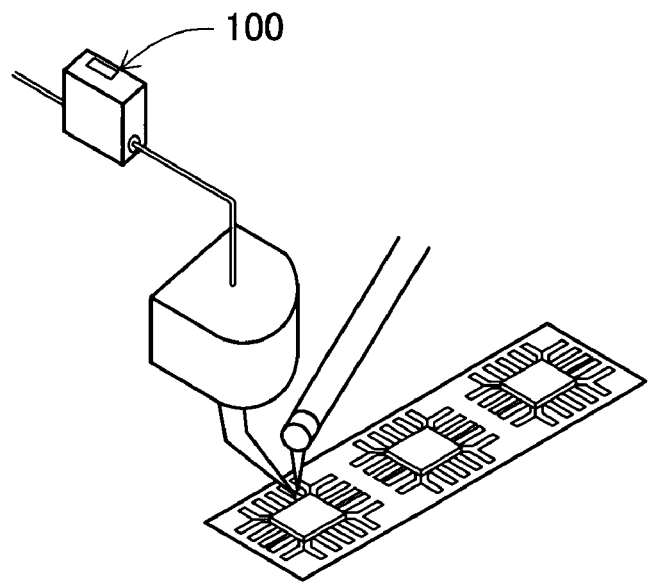
FIG. 10 is a view showing an example of using the flow controller of the present embodiment for tension control of a gold wire for wire bonding.

On the other hand, as shown in FIG. 10, when the flow controller 100 is used for tension control of the gold wire for wire bonding, the flow controller of the invention which detects a flow rate with a microfabricated sensor chip can achieve high-speed control. Even when the original pressure varies, the flow controller can control the flow rate immediately, thereby avoiding the above problem.

The ionizer is used for the purpose of static protection (preventing adhesion of dust or dirt in a manufacturing process of liquid crystal or the like) and others. The flow rate of nitrogen gas has to be changed from one workpiece to another. Thus, the flow rate of nitrogen gas has conventionally been controlled with the metering valve (the needle valve). However, this method may cause a change in flow rate as original pressure varies, and the static protection could not be stably maintained. An operator had to control the flow rate of nitrogen gas every time one workpiece is changed to another.

Figure 11:
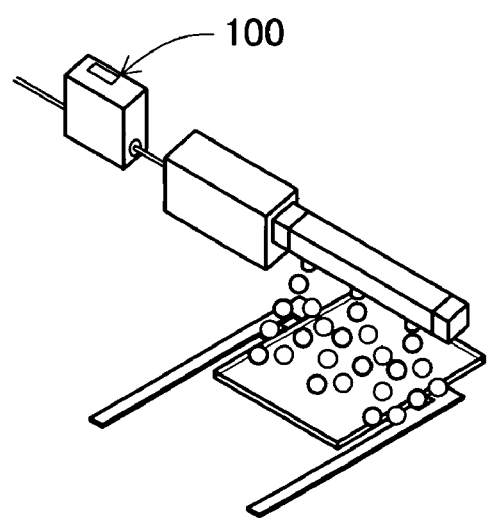
FIG. 11 is a view showing an example of using the flow controller of the present embodiment for control of a flow rate of nitrogen gas in an ionizer.

On the other hand, as shown in FIG. 11, when the flow controller 100 is used to control the flow rate of nitrogen gas in the ionizer, the flow rate of nitrogen gas is automatically immediately controlled even when original pressure varies, thereby avoiding the above problems. Even where one workpiece is changed to another, the flow rate of nitrogen gas is automatically controlled and therefore an operator does not have to control the flow rate of nitrogen gas every time one workpiece is changed to another.

As to the floating transfer of glasses such as liquid crystal, the flow rate has conventionally been controlled with the metering valve (the needle valve). However, this method may cause a change in flow rate as original pressure varies and therefore a floating amount could not be controlled stably. Further, an operator had to control the floating amount every time one workpiece is changed to another.

Figure 12:
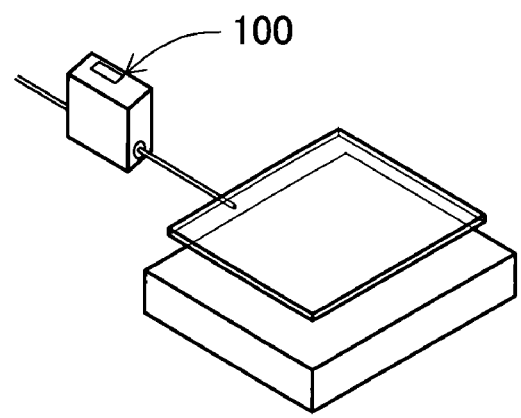
FIG. 12 is a view showing an example of using the flow controller of the present embodiment in a floating transfer device for glass.

On the other hand, as shown in FIG. 12, when the flow controller 100 is used in the floating transfer device for glasses such as liquid crystal, the flow rate can be controlled immediately to regulate a floating amount automatically even when original pressure varies, thereby avoiding the above problem. Since the floating amount is automatically controlled even when one workpiece is changed to another, an operator does not have to regulate the flowing amount every time one workpiece is changed to another.

Moreover, as to food packaging, a pressure sensor has conventionally been used for filling inert gas in such a way as to complete the filling when the internal pressure of a package reaches predetermined pressure. However, this method may cause a problem that a filling amount will changes as atmosphere pressure varies, resulting in unstable filling.

Figure 13:
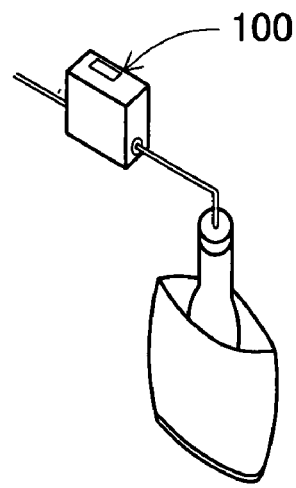
FIG. 13 is a view showing an example of using the flow controller of the present embodiment for food packaging.

On the other hand, as shown in FIG. 13, when the flow controller 100 is used for food packaging, the flow rate of fluid to be filled does not change even when atmosphere pressure varies. The above problem therefore can be solved.

Problematically, mirrors and lenses of optical devices such as a semiconductor laser and a stepper have been likely to cloud unless they are purged with a certain amount of nitrogen gas. Therefore, the purging amount of nitrogen gas has conventionally been controlled with a metering valve (a needle valve). However, this method would cause a problem that the purging amount changes as original pressure varies. Further, an operator had to control the purging amount every time one workpiece is changed to another.

Figure 14:
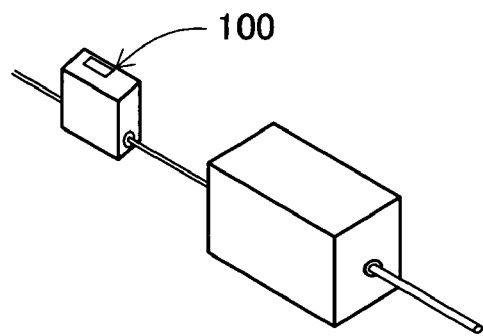
FIG. 14 is a view showing an example of using the flow controller of the present embodiment for regulation of a purging amount of nitrogen gas.

On the other hand, as shown in FIG. 14, when the flow controller 100 is used to control the purging amount of nitrogen gas in a semiconductor laser or a semiconductor manufacturing apparatus, the purging amount of nitrogen gas is automatically controlled as soon as original pressure varies. Thus, the above problem can be solved. Since the purging amount of nitrogen gas is automatically controlled even when a workpiece is changed, an operator does not have to control the purging amount every time one workpiece is changed to another.

For flow control of argon gas for welding, heretofore, an area flow meter with a needle valve has been used. However, this method would cause a problem that the flow rate changes as original pressure varies and thus the flow control could not be performed well. Further, an operator had to conduct the flow regulation every time one workpiece is changed to another.

Figure 15:
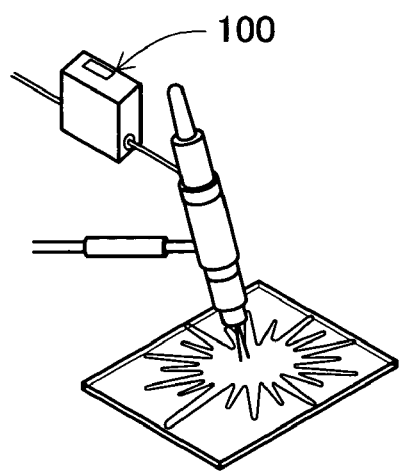
FIG. 15 is a view showing an example of using the flow controller of the present embodiment for control of a flow rate of welding argon gas.

On the other hand, as shown in FIG. 15, when the flow controller 100 is used for the flow control of argon gas for welding, the flow rate can be automatically controlled as soon as original pressure varies, thus solving the above problem. Since the flow rate is automatically controlled even when a workpiece is changed, an operator does not have to perform the flow control every time one workpiece is changed to another.

For flow control in the control of heating power of a burner, heretofore, an area flow meter with a needle valve has been used. However, this method would cause a problem that the flow rate changes as original pressure varies and thus the control of heating power of the burner could not be performed well. Further, an operator had to conduct the flow control every time one workpiece is changed.

Figure 16:
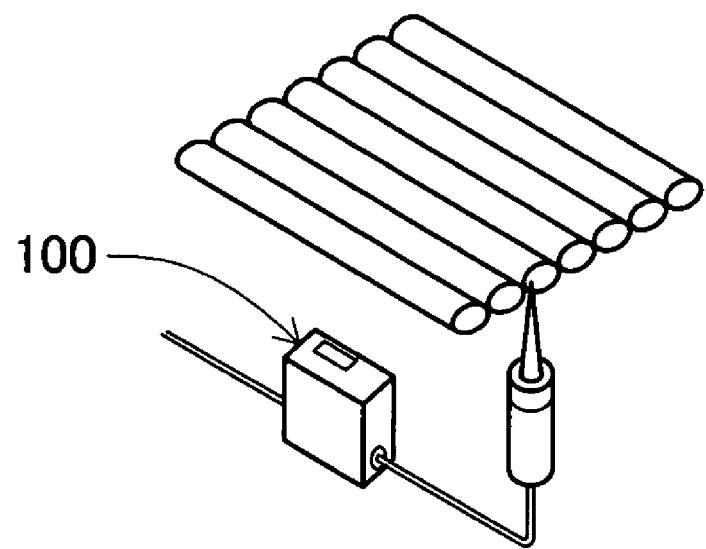
FIG. 16 is a view showing an example of using the flow controller of the present embodiment for control of a flow rate for heating power control of a burner.

On the other hand, as shown in FIG. 16, when the flow controller 100 is used for flow control in the control of heating power of a burner, the flow rate can be automatically controlled as soon as original pressure varies. Thus, the above problem can be solved. Since the flow rate is automatically controlled even when one workpiece is changed to another, an operator does not have to perform the flow control every time one workpiece is changed to another.

Figure 17:
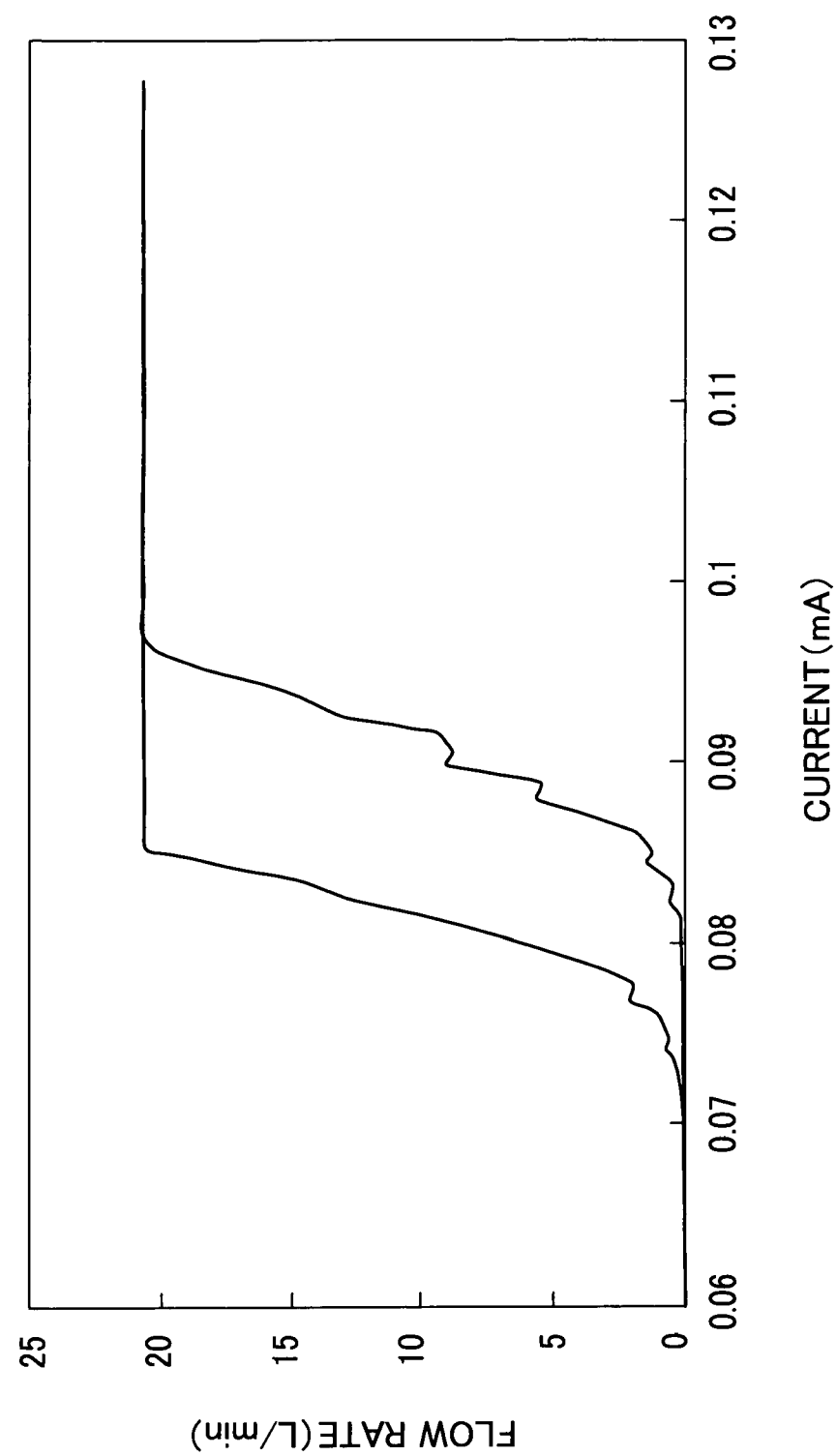
FIG. 17 is a graph showing a relationship between a current to be applied to a coil and a flow rate.
Figure 18:
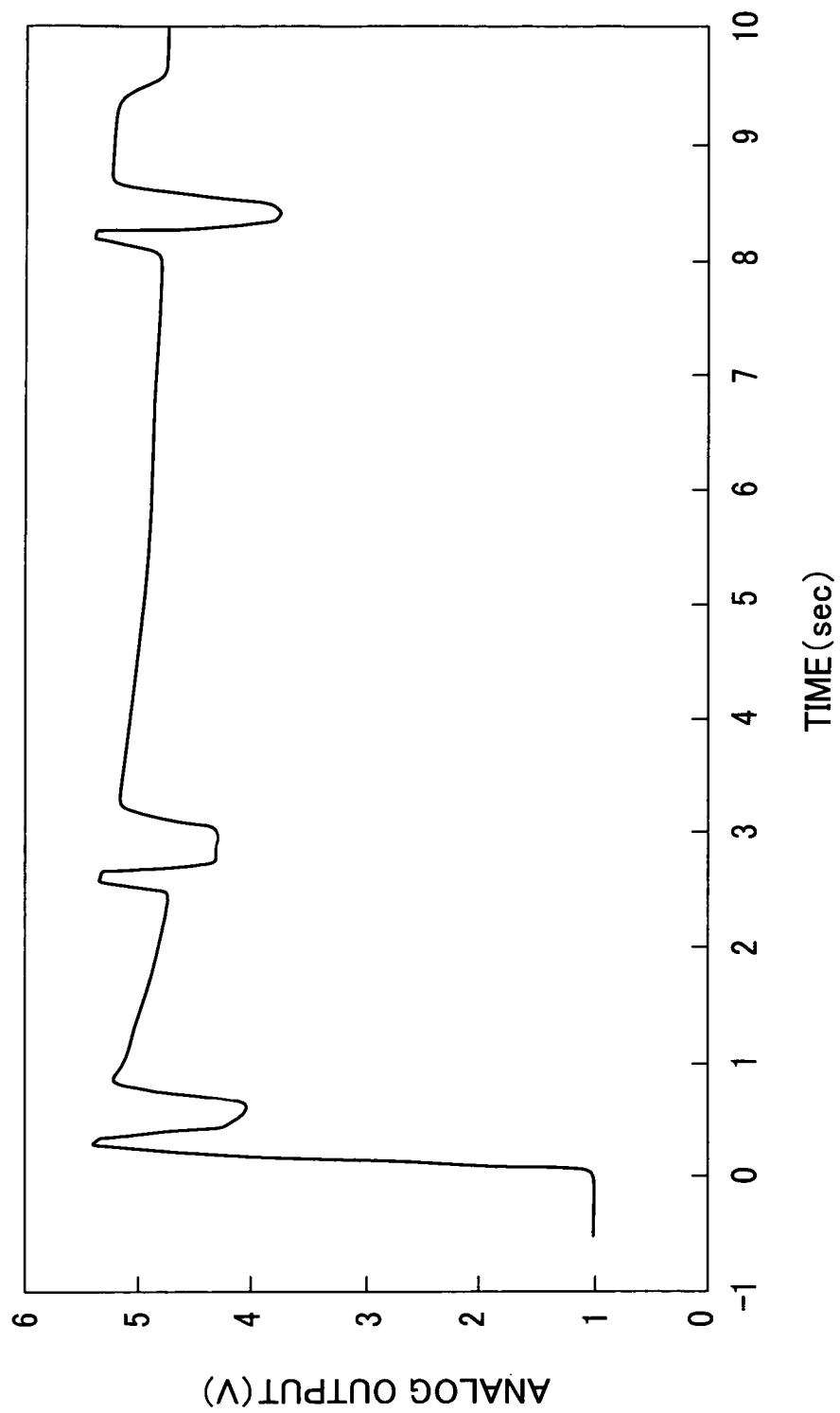
FIG. 18 is a graph showing a relationship between control time and sensor output.

When the flow control valve 10 was arranged such that the first fixed core 23a and the movable core 24 have facing tapered portions protruding downward, it was found that sliding resistance between the movable core 24 and the disc part 28a of the flared pipe 28 increased, resulting in nonsmooth movement of the movable core 24. Hence, the proportional characteristics and the controllability of the above flow control valve were examined. The results thereof are shown in FIGS. 17 and 18. FIG. 17 is a graph showing a relationship between a current to be applied to the coil and a flow rate. FIG. 18 is a graph showing a relationship between control time and sensor output.

As clearly found from FIG. 17, in the case where the facing portions of the first fixed core 23a and the movable core 24 are tapered to protrude downward, the proportional characteristics of the flow control valve largely deteriorated. As obviously found from FIG. 18, the time needed to reach a target flow rate (the time to fall within a specified error range) was increased, resulting in deterioration of controllability.

Figure 19:
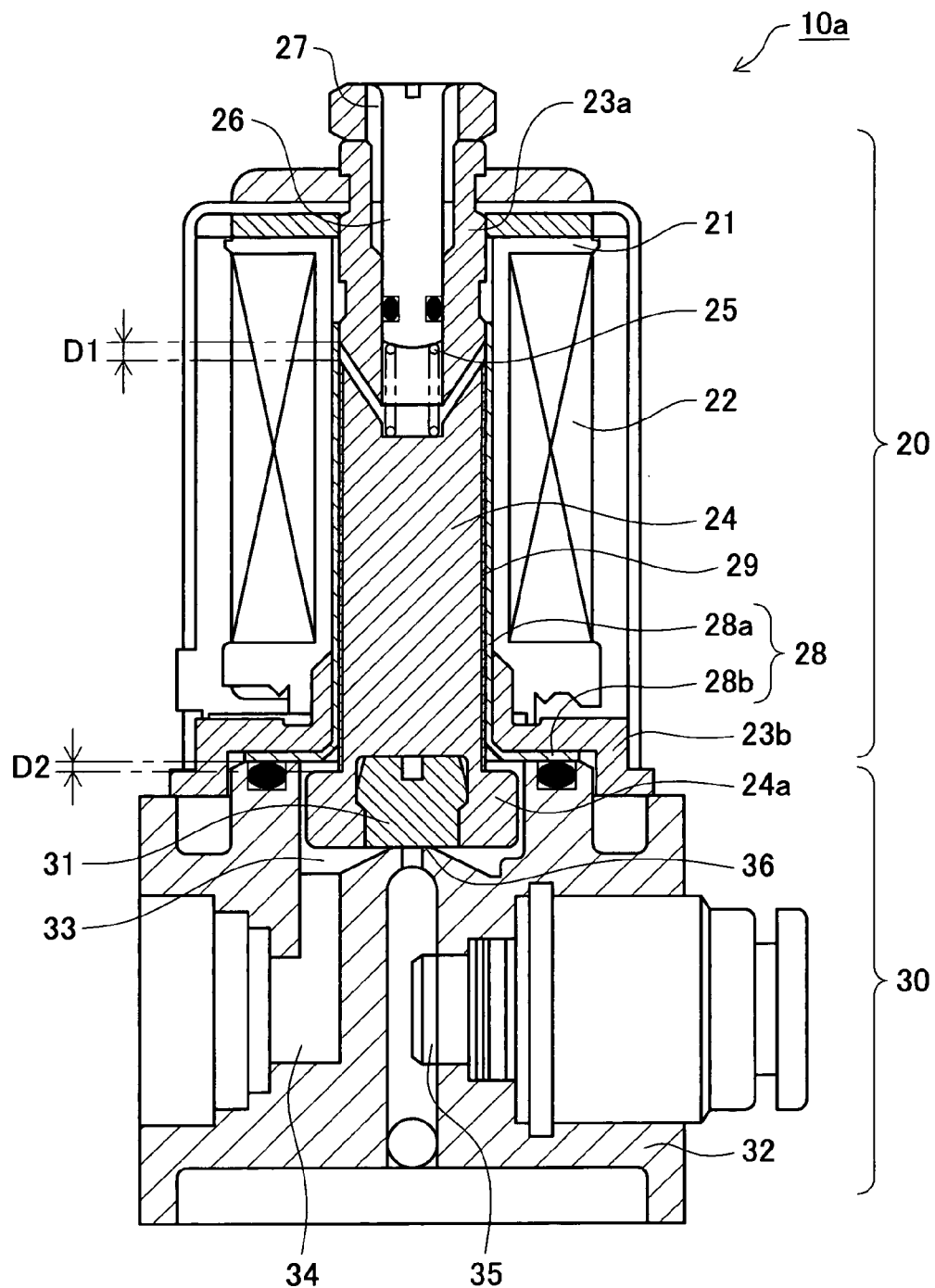
FIG. 19 is a sectional view showing a schematic configuration of a modified flow control valve.
Figure 20:
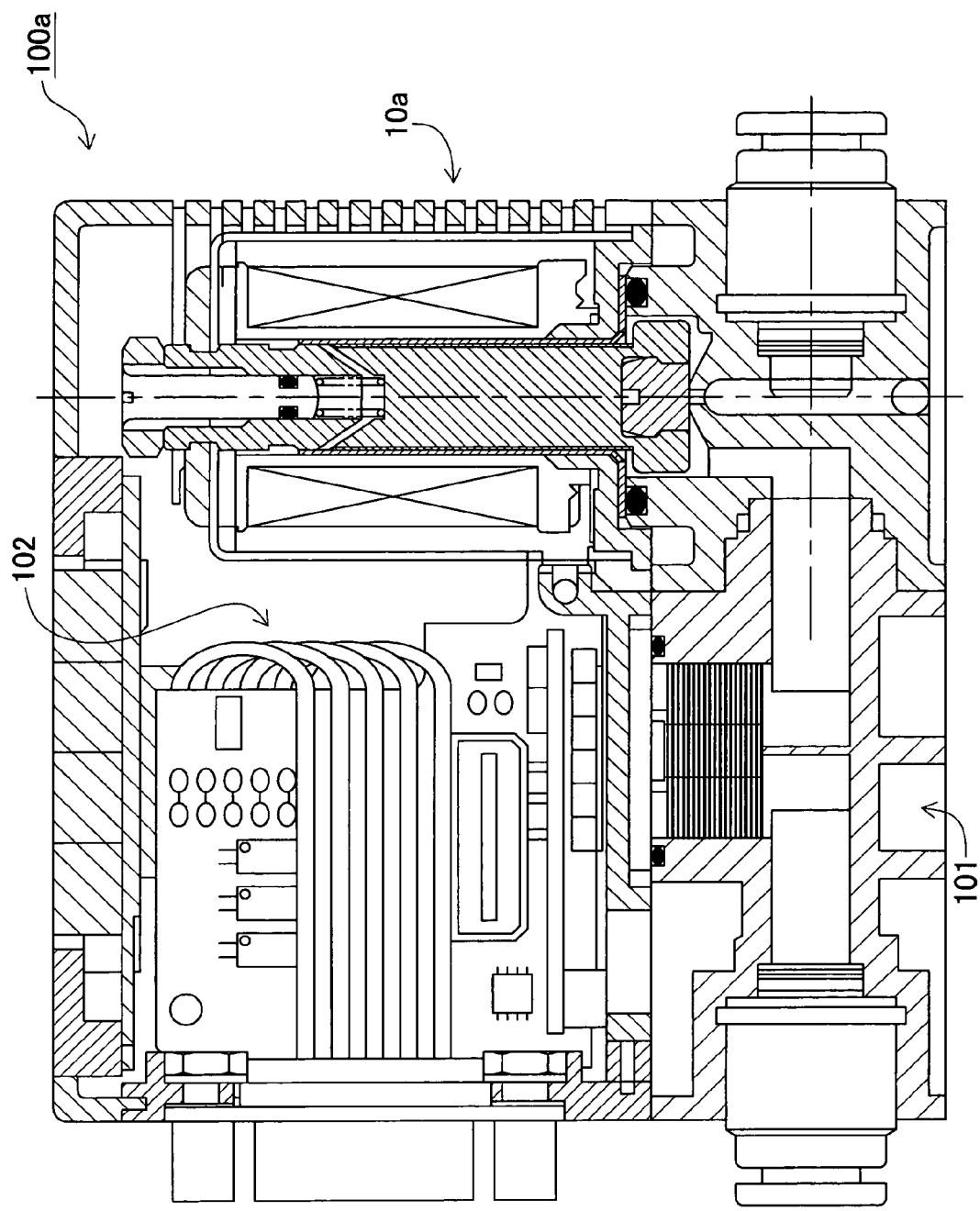
FIG. 20 is a sectional view showing a schematic configuration of a flow controller built in the modified flow control valve.

The applicant of the present application therefore modified the flow control valve 10 to develop a flow control valve 10a shown in FIG. 19 and a flow controller 100a shown in FIG. 20. FIG. 19 is a sectional view showing a schematic configuration of the modified flow control valve. FIG. 20 is a sectional view showing a schematic configuration of the flow controller in which the modified flow control valve is built in. As shown in FIG. 19, this flow control valve 10a has substantially the same structure as the flow control valve 10, excepting that a resin tube 29 is attached to the movable core 24, and the first fixed core 23a and the movable core 24 have the facing tapered portions protruding downward. In the present embodiment, a heat shrinkage tube made of fluorinated ethylene propylene is used as the resin tube.

In this flow control valve 10a, the resin tube 29 is attached to the movable core 24 so that the movable core 24 slides within the cylindrical part 28a of the flared pipe 28 through the resin tube 29, thereby reducing sliding resistance of the movable core 24. This makes it possible to move the movable core 24 smoothly.

As shown in FIG. 20, a flow controller 100a was developed by use of the above flow control valve 10a. The flow sensor 101 used in the flow controller 100a is the same as the flow sensor used in the flow controller 100. This flow controller 100a also could provide the same advantages as the aforementioned flow controller 100.

Figure 21:
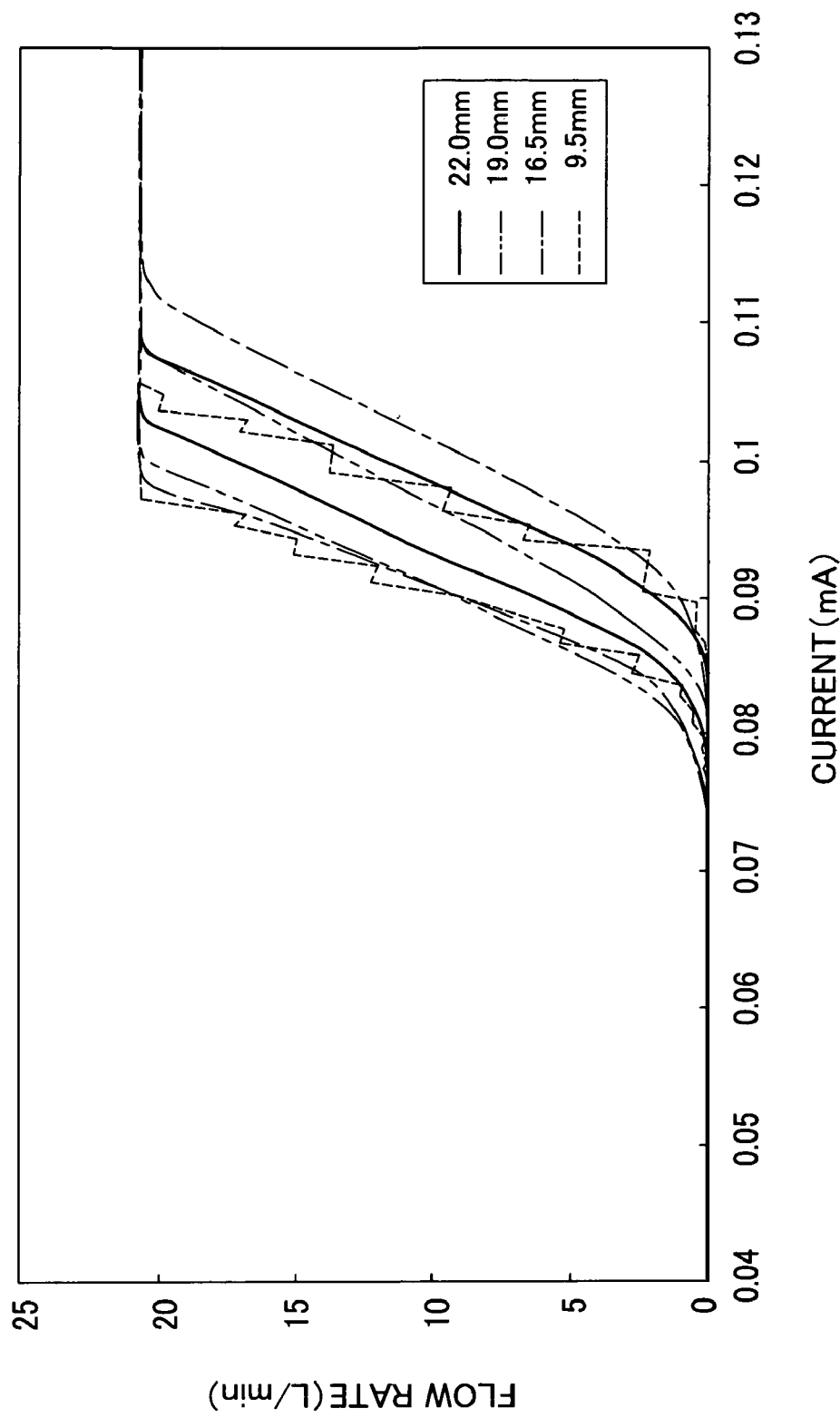
FIG. 21 is a graph showing a relationship between a current to be applied to a coil and a flow rate in the case where resin tube having different lengths are used.
Figure 22:
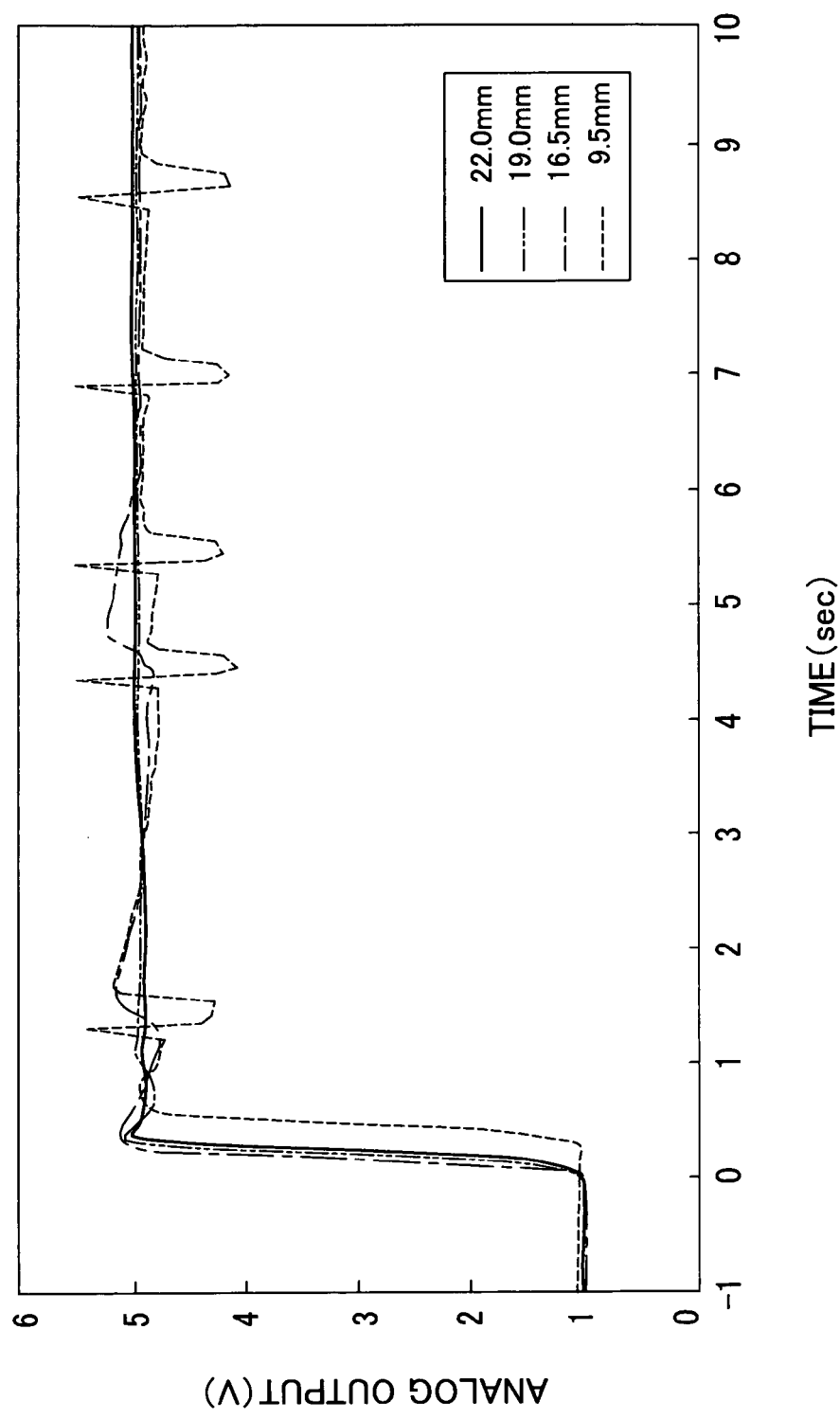
FIG. 22 is a graph showing a relationship between control time and sensor output in the case where resin tube having different lengths are used.

The length and the attachment position of the resin tube added in the flow control valve 10a were studied, and results thereof are shown below. The result of examining the relationship between the length of the resin tube 29 and the proportional characteristics of the flow control valve 10a is shown in FIG. 21. The result of examining the relationship between the length of the resin tube 29 and the controllability of the flow control valve 100a is shown in FIG. 22. FIG. 21 is a graph showing the relationship between a current to be applied to the coil and the flow rate. FIG. 22 is a graph showing the relationship between control time and sensor output. In those experiments, the proportional characteristics and the controllability were examined using resin tubes of different lengths; 9.5 mm, 16.5 mm, 19 mm, and 22 mm, each of which was attached to the movable core 24 having a length of about 22 mm excepting the flange 24a. The resin tube is placed with its lower end aligned with the upper surface of the flange 24a. Accordingly, as the length of the resin tube is shorter, an area of the movable core 24 uncovered with the tube from the upper end extends wider.

As is clear from a comparison between FIG. 17 and FIG. 21, attaching the resin tube 29 to the movable core 24 could provide improved proportional characteristics to the flow control valve 10a. When the length of the resin tube 29 is 9.5 mm, no improvement is found in the proportional characteristics of the flow control valve 10a. As is obvious from FIG. 22, when the length of the resin tube 29 is 9.5 mm, the flow controller 100a is inferior in the controllability and hence could not stably control at the target flow rate. It is therefore found that the length of the resin tube 29 is preferably set to be longer than 9.5 mm, that is, longer than half the length of a portion (excepting the flange 24a) of the movable core 24 slidable within the flared pipe 28.

As clearly from FIG. 21, the hysteresis of the flow control valve 10a is reduced as the length of the resin tube 29 is longer. Further, as evident from FIG. 22, the controllability of the flow controller 100a, namely, the time needed to enable the control at the target flow rate is shorter as the length of the resin tube 29 is longer. It is found that, when the length of the resin tube 29 is 16.5 mm or longer, the hysteresis of the flow control valve 10a is reduced and the response and the controllability of the flow controller 100a can be enhanced. In order to reduce the hysteresis of the flow control valve 10a and also enhance the response and the controllability of the flow controller 100a, consequently, the length of the resin tube 29 has to be set to ¾ or more of the length of the portion of the movable core 24 (excepting the flange 24a) which slides within the flared pipe 28.

Figure 23:
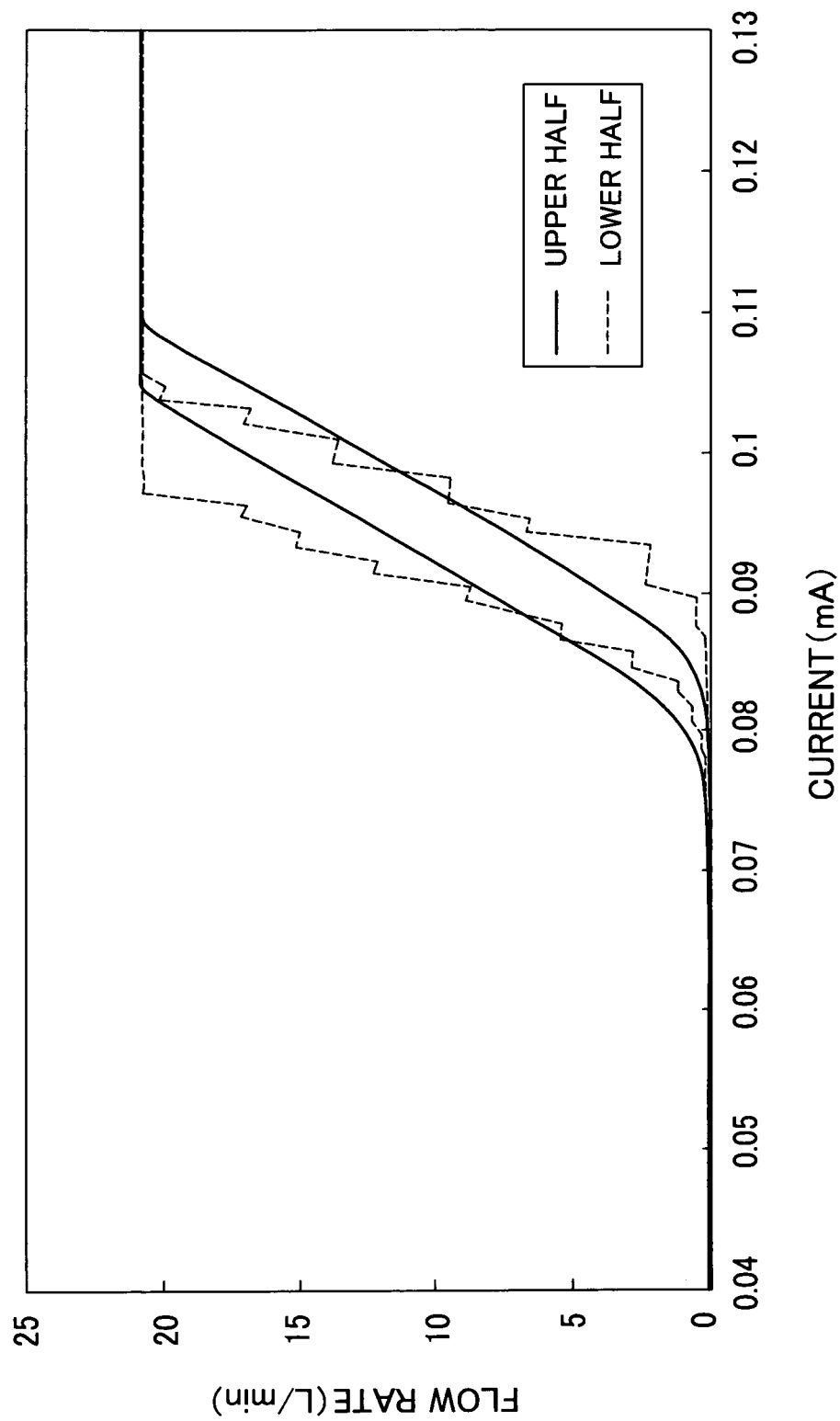
FIG. 23 is a graph showing a relationship between a current to be applied to a coil and a flow rate in the case where resin tubes are placed in different positions.
Figure 24:
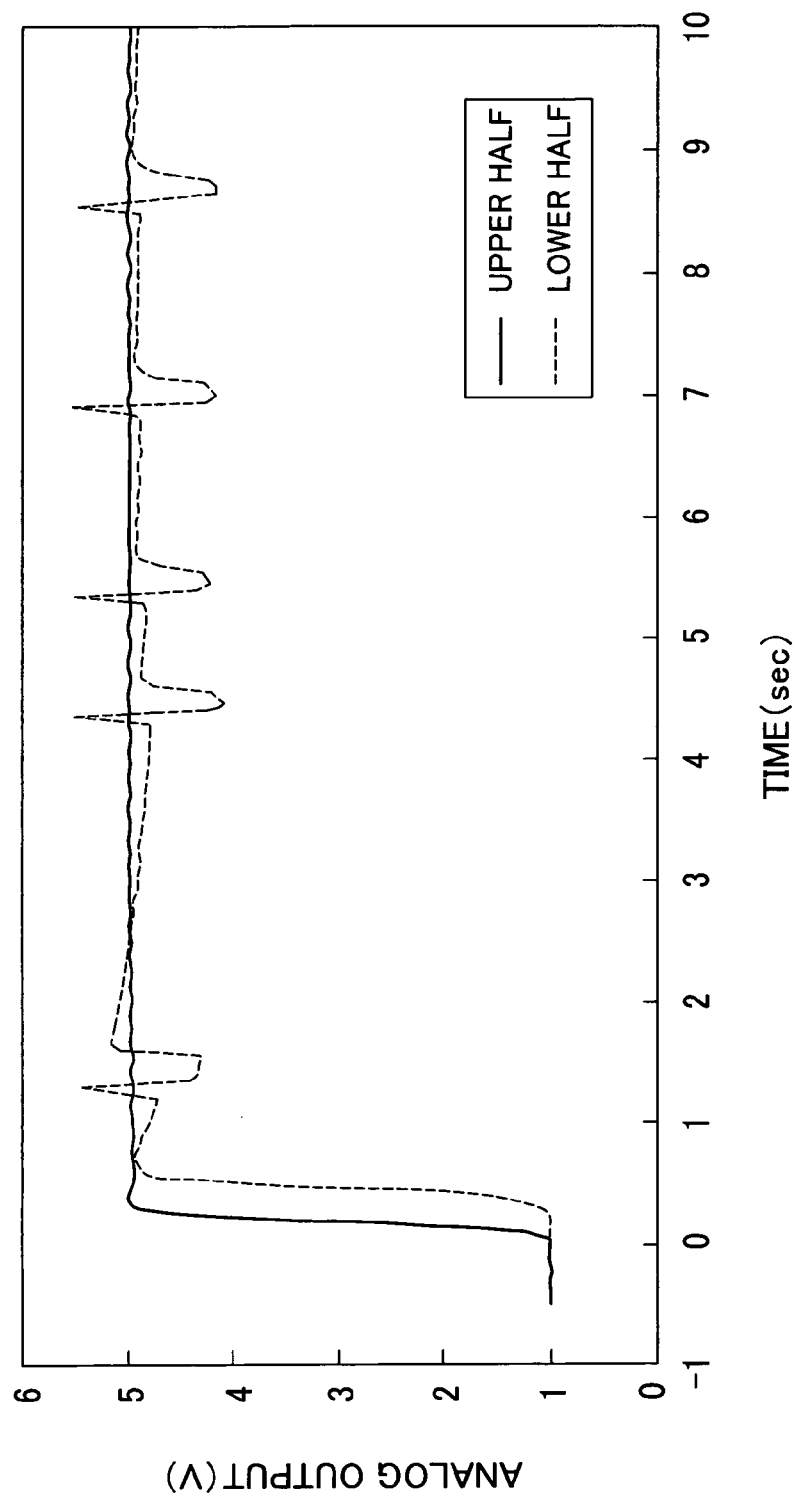
FIG. 24 is a graph showing a relationship between control time and sensor output in the case where resin tubes are placed in different positions.

The result of examining the relationship between the attachment position of the resin tube 29 and the proportional characteristics of the flow control valve 10a is shown in FIG. 23. The result of examining the relationship between the attachment position of the resin tube 29 and the controllability of the flow controller 100a is shown in FIG. 24. FIG. 23 is a graph showing the relationship between a current to be applied to the coil and the flow rate. FIG. 24 is a graph showing the relationship between control time and sensor output. In those experiments, the resin tube of 9.5 mm was used to examine the proportional characteristics and the controllability in each of the cases where the resin tube 29 was attached to a lower half of the movable core 24 (attached so that the lower end of the tube 29 was aligned with the lower end of the movable core 24 (the upper surface of the flange 24a)) and where the tube was attached to an upper half of the movable core 24 (attached so that the upper end of the tube 29 was aligned with the upper end of the movable core 24)).

As obvious from FIGS. 23 and 24, in the case where the resin tube 29 is attached to the lower half of the movable core 24, the flow control valve 10a is inferior in proportional characteristics and the flow controller 100a is also inferior in controllability. In the case where the resin tube 29 is attached to the upper half of the movable core 24, on the other hand, the flow control valve 10a is superior in controllability and further the hysteresis is small, and the flow controller 100a is also superior in controllability. Those experiment results reveal that it is preferable to attach the resin tube 29 with its upper end aligned with the upper end of the movable core 24.

Figure 25:
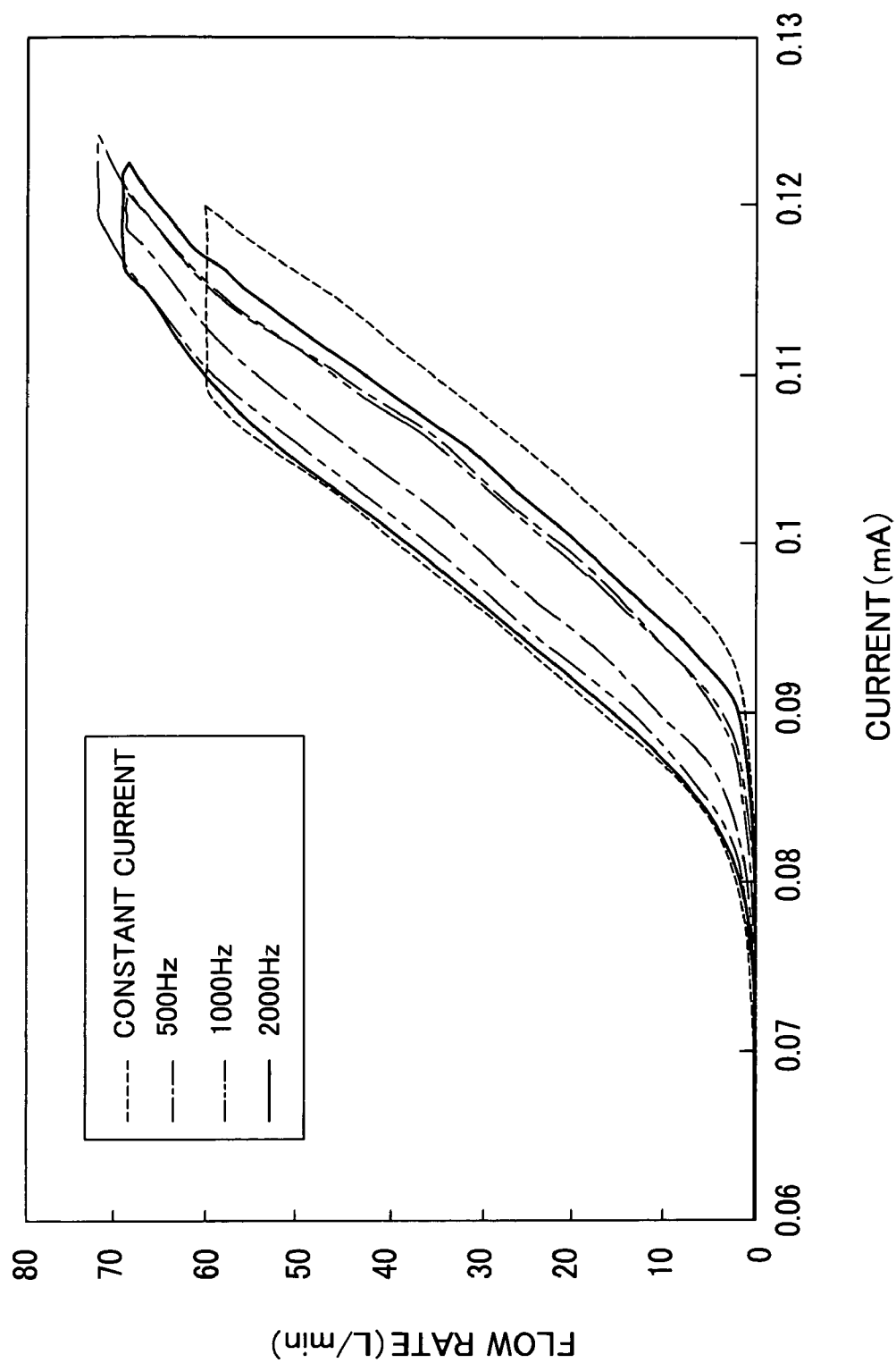
FIG. 25 is a graph showing a relationship between a current to be applied to a coil and a flow rate in the case where constant current control is changed to PWM control.
Figure 26:
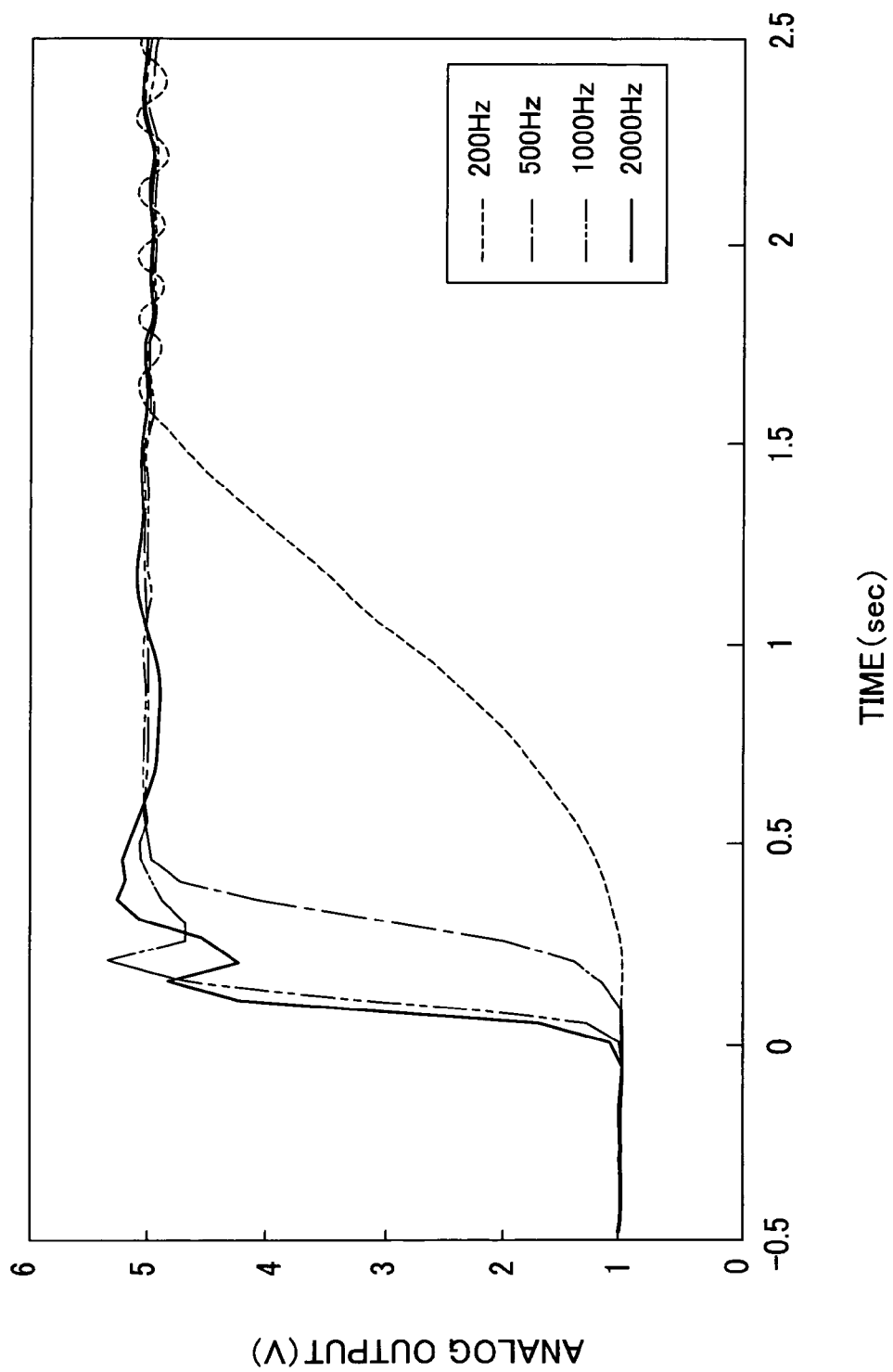
FIG. 26 is a graph showing a relationship between control time and sensor output in the case where carrier frequency of the PWM control is changed.

The results of examining the control characteristics in the cases where the valve opening control of the flow control valve 10a was performed by the PWM control and by the constant current control respectively are shown in FIG. 25. FIG. 25 is a graph showing the relationship between a current to be applied to the coil and a flow rate. FIG. 26 is a graph showing the relationship between control time and sensor output.

As evident from FIG. 25, when the opening control of the flow control valve 10a is changed from the constant current control to the PWM control, the hysteresis of the flow control valve 10a can be reduced. In the case of performing the PWM control, as the carrier frequency in the PWM control is larger, the hysteresis of the flow control valve 10a increases. To reduce the hysteresis of the flow control valve 10a, accordingly, the opening control of the flow control valve 10a is preferably performed by the PWM control with a small carrier frequency.

As shown in FIG. 26, on the other hand, as the carrier frequency in the PWM control is smaller, the response of the flow controller 100a deteriorates. To enhance the response of the flow controller 100a, the carrier frequency has only to be larger. As the carrier frequency is larger, however, the overshoot amount is apt to increase.

The above results reveal that the carrier frequency has only to be set in the order of 500 Hz to 1000 Hz to enhance the response while reducing the hysteresis of the flow control valve 10a and restraining the overshoot amount.

In the flow control valve 10 of the present embodiment, as explained above in detail, the movable core 24 is formed at its lower end with the flange 24a having a larger diameter than an inner diameter of the coil bobbin 21 and the movable core 24 is placed so that the distance D1 between the first fixed core 23a and the movable core 24 is larger than the distance D2 between the flange 24a and the disc plate 28b of the flared pipe 28. Accordingly, during full valve opening, the movable core 24 does not come into close contact with the fixed core 23a. The flow control valve 10 can consequently prevent deterioration in the proportional characteristics caused in the conventional product during the opening control from full open to full close.

In the flow control valve 10, the first fixed core 23a and the movable core 24 have the tapered facing portions, and the movable core 24 is formed at its lower end with the flange 24a having the larger diameter than the inner diameter of the coil bobbin 21. It is therefore possible to increase the attractive force of the fixed cores 23a and 23b to enhance the magnetic characteristics. Accordingly, the flow control valve 10 can prevention of a decrease in the attractive force of the fixed cores 23a and 23b resulting from the formation of the tapered facing portions of the first fixed core 23a and the movable core 24.

Since the flow control valve 10a includes the resin tube 29 attached to the movable core 24, the sliding resistance of the movable core 24 can be reduced, thereby moving the movable core 24 more smoothly. As a result, the proportional characteristics of the flow control valve 10a can be enhanced and the flow controller 100a can stably perform flow control with high accuracy. In particular, in the flow controller 100a, when the flow control valve 10a is PWM-controlled and the carrier frequency is set in the order of 500 Hz to 1000 Hz, the response can be improved while the overshoot amount is restrained.

It will be understood by those skilled in the art that the foregoing description of the invention is by way of example only and it is not meant to impart any limitation on the scope of the claims which follow. Of course, the invention may be embodied in other specific forms without departing from the essential characteristics thereof. For instance, in the aforesaid embodiment, the flow control valve 10a includes the first fixed core 23a and the movable core 24 having the tapered facing portions protruding downward. Alternatively, the tapered facing portions may be formed protruding upward. In other words, a resin tube may be attached to the movable core of the flow control valve 10.

In the flow control valve 10a, the resin tube 29 is attached to the movable core 24. Alternatively, the resin tube 29 may be attached to the inside of the cylindrical part 28a of the flared pipe 28. Further, the aforementioned embodiment uses fluorinated ethylene propylene as the material of the resin tube 29 or may use polyamide or polypropylene.

The invention claimed is:

1. A flow control valve comprising:
   a valve body provided with an inlet passage, an outlet passage, a valve chamber which provides communication between the inlet passage and the outlet passage, and a valve seat formed in a communication area between the valve chamber and the outlet passage;

a coil including wire wound on a hollow coil bobbin;

a first fixed core fixed in an upper part of the coil bobbin;

a second fixed core fixed in a lower part of the coil bobbin;

a nonmagnetic flared pipe including a cylindrical part fixed to the first fixed core and a disc part formed around the periphery of a lower end of the cylindrical part, part of the disc part being held between the second fixed core and the valve body;

a movable core placed slidably in the cylindrical part of the flared pipe and provided at its lower end with a valve element; and a spring that always urges the movable core in a direction to move away from the first fixed core to bring the valve element into contact with the valve seat;

the movable core being formed at its lower end with a flange part having a diameter larger than an inner diameter of the coil bobbin, the flange being placed in the valve chamber, and a distance between the first fixed core and the movable core is set to be larger than a distance between the flange and the disc part of the flared pipe while the valve element is in the valve seat.

2. The flow control valve according to claim 1, wherein the movable core and the fixed core are formed with tapered facing portions.

3. A flow controller comprising:
the flow control valve according to claim 2;
a flow sensor for measuring a flow rate; and
control means for controlling an opening degree of the flow control valve based on output of the flow sensor so that a measurement valve obtained by the flow sensor becomes a target value.

4. The flow control valve according to claim 1 further comprising an adjustment mechanism for adjusting an urging force of the spring with respect to the movable core.

5. A flow controller comprising:
the flow control valve according to claim 4;
a flow sensor for measuring a flow rate; and
control means for controlling an opening degree of the flow control valve based on output of the flow sensor so that a measurement valve obtained by the flow sensor becomes a target value.

6. The flow control valve according to claim 1 further comprising a resin member interposed between the flared pipe and the movable core.

7. The flow control valve according to claim 6, wherein the length of the resin member is set to be half or more of the length of a portion of the movable core slidable in the flared pipe.

8. The flow control valve according to claim 7, wherein the resin member is placed in such a manner as to be in contract with the periphery of an end of the movable core closer to the first fixed core while the valve element is in a full open state.

9. The flow control valve according to claim 8, wherein the resin member is formed of fluorinated resin.

10. The flow control valve according to claim 6, wherein the resin member is placed in such a manner as to be in contact with the periphery of an end of the movable core closer to the first fixed core while the valve element is in a full open state.

11. The flow control valve according to claim 10, wherein the resin member is formed of fluorinated resin.

12. The flow control valve according to claim 6, wherein the resin member is formed of fluorinated resin.

13. A flow controller comprising:
the flow control valve according to claim 6;
a flow sensor for measuring a flow rate; and
control means for controlling an opening degree of the flow control valve based on output of the flow sensor so that a measurement valve obtained by the flow sensor becomes a target value.

14. A flow controller comprising:
the flow control valve according to claim 1;
a flow sensor for measuring a flow rate; and
control means for controlling an opening degree of the flow control valve based on output of the flow sensor so that a measurement value obtained by the flow sensor becomes a target value.

15. The flow controller according to claim 14, wherein the flow sensor includes:
a sensor passage across which a hot wire is laid to measure the flow rate;
a bypass passage with respect to the sensor passage; and
a laminated body composed of laminated thin plates each having an opening to internally divide a fluid into the sensor passage and the bypass passage.

16. The flow controller according to claim 15, wherein the control means is arranged to control the opening degree of the flow control valve by PWM control.

17. The flow controller according to claim 16, wherein a carrier frequency of the PWM control is set to be 200 Hz or more.

18. The flow controller according to claim 14, wherein the control means is arranged to control the opening degree of the flow control valve by PWM control.

19. The flow controller according to claim 18, wherein a carrier frequency of the PWM control is set to be 200 Hz or more.

* * * * *